US010896454B2

(12) United States Patent
Sebastian et al.

(10) Patent No.: US 10,896,454 B2
(45) Date of Patent: Jan. 19, 2021

(54) REWARD-BASED SURROGATE SHOPPING SYSTEM AND METHOD

(71) Applicant: Meijer, Inc., Grand Rapids, MI (US)

(72) Inventors: Arthur Francis Sebastian, Grand Rapids, MI (US); Justin Kyle Sessink, Grand Rapids, MI (US); Peter Michael Strong, Kentwood, MI (US); Christopher Mark Brush, Grand Rapids, MI (US)

(73) Assignee: Meijer, Inc., Grand Rapids, MI (US)

( * ) Notice: Subject to any disclaimer, the term of this patent is extended or adjusted under 35 U.S.C. 154(b) by 536 days.

(21) Appl. No.: 15/434,229

(22) Filed: Feb. 16, 2017

(65) Prior Publication Data
US 2017/0236177 A1 Aug. 17, 2017

Related U.S. Application Data

(60) Provisional application No. 62/296,417, filed on Feb. 17, 2016.

(51) Int. Cl.
*G06Q 30/00* (2012.01)
*G06Q 30/06* (2012.01)
(Continued)

(52) U.S. Cl.
CPC ..... *G06Q 30/0617* (2013.01); *G06Q 30/0208* (2013.01); *G06Q 30/0635* (2013.01);
(Continued)

(58) Field of Classification Search
None
See application file for complete search history.

(56) References Cited

U.S. PATENT DOCUMENTS

| 7,882,043 B2 * | 2/2011 | Bantz | G06Q 30/0273 705/346 |
| 10,026,055 B2 * | 7/2018 | Riel-Dalpe | G06Q 10/0833 |

(Continued)

OTHER PUBLICATIONS

Stanley C. Hollander et al., "Shopping with Other People's Money", Apr. 1999, Journal of Marketing, vol. 63 (Apr. 1999), pp. 102-118 (Year: 1999).*

(Continued)

*Primary Examiner* — Naresh Vig
(74) *Attorney, Agent, or Firm* — Barnes & Thornburg LLP

(57) ABSTRACT

A method for reward-based surrogate shopping may include receiving remote orders from remote shoppers, each including order parameters defining items for purchase and a desired date or time of day of fulfillment of the remote order, receiving assignment requests from surrogate shoppers, each including request parameters identifying a brick-and-mortar store and a desired date or time of day for fulfilling by the surrogate shopper of one or more remote orders, comparing the received remote orders with the received assignment requests and pairing together ones in which at least one order parameter matches at least one request parameter, and for each matched pair, receiving a completion indicator identifying fulfillment by the surrogate shopper of the remote order paired therewith, and providing a reward to the surrogate shopper for completion of surrogate shopping at the identified store for the paired remote order.

20 Claims, 8 Drawing Sheets

(51) Int. Cl.
  *G06Q 30/02* (2012.01)
  *H04W 4/33* (2018.01)
  *H04W 4/021* (2018.01)

(52) U.S. Cl.
  CPC ......... *G06Q 30/0639* (2013.01); *H04W 4/021* (2013.01); *H04W 4/33* (2018.02)

(56) References Cited

U.S. PATENT DOCUMENTS

| | | | | |
|---|---|---|---|---|
| 2011/0131120 A1* | 6/2011 | Sciuk | ............ | G06Q 10/063112 |
| | | | | 705/34 |
| 2014/0040043 A1* | 2/2014 | Barron | ................... | G06Q 10/00 |
| | | | | 705/14.66 |
| 2014/0279238 A1* | 9/2014 | Jones | ................. | G06Q 30/0617 |
| | | | | 705/26.43 |
| 2014/0279294 A1* | 9/2014 | Field-Darragh | ..... | G06Q 10/087 |
| | | | | 705/28 |

OTHER PUBLICATIONS

Barter, Dec. 12, 2015, Wikipedia, printed through www.archive.org (Date is in URL in YYYYMMDD format) (Year: 2015).*
Juggernaut, How Uber Works—Insights into Business and Revenue Model, Sep. 29, 2015, NextJuggernaut.com (Year: 2015).*
Definition of Shopper, Jan. 5, 2020, Merriam-Webster.com (Year: 2020).*
TaskRabbit, Jan. 25, 2016, www.wikipedia.com, printed through www.archive.org (Year: 2016).*
Information on Instacart, 2015, www.instacart.com, www.instacart.com, archived web pages printed through www.archive.org, date is in the URL in YYYYMMDD format (Year: 2015).*

* cited by examiner

REWARD-BASED SURROGATE SHOPPING SYSTEM AND METHOD

CROSS-REFERENCE TO RELATED APPLICATION

This patent application claims the benefit of, and priority to, U.S. Provisional Patent Application Ser. No. 62/296,417, filed Feb. 17, 2016, the disclosure of which is incorporated herein by reference.

FIELD OF THE INVENTION

The present invention relates generally to systems and methods for providing product/service purchase conveniences and/or incentives to customers of a retail enterprise, and more specifically to systems and methods for providing such conveniences and/or incentives in the form of a rewards-based surrogate shopping system and method.

BACKGROUND

Retailers of goods and services sometimes offer product/service purchase conveniences and/or incentives to customers for one or more such goods and services. Some such conveniences may include providing for remote shopping services, so-called curb-side pickup of remote orders, and the like, and some such incentives may include providing virtual or other discount coupons or vouchers redeemable against products/services, and the like.

SUMMARY

The present disclosure may comprise one or more of the features recited in the attached claims, and/or one or more of the following features and combinations thereof. In one aspect, a method for reward-based surrogate shopping at a retail enterprise may comprise receiving, by a server of the retail enterprise, a plurality of remote orders each specified through interaction by a different one of a corresponding plurality of remote shoppers with an associated remote shopper mobile communication device or computing device, each of the plurality of remote orders including order parameters defining for purchase by a corresponding one of the plurality of remote shoppers one or more items offered for sale by the retail enterprise and at least one of a desired date and a desired time of day of fulfillment of the remote order, receiving, by the server, a plurality of assignment requests each specified through interaction by a different one of a plurality of surrogate shoppers with an associated surrogate shopper mobile communication device or computing device, each of the plurality of assignment requests including request parameters identifying one of a plurality of brick-and-mortar stores of the retail enterprise and at least one of a desired date and a desired time of day for fulfilling by the corresponding surrogate shopper of one or more remote orders at the identified brick-and-mortar store, comparing, by the server, the plurality of received remote orders with the plurality of received assignment requests and pairing ones of the remote orders with ones of the assignment requests in which at least one of the order parameters matches at least one of the request parameters, for each of the matched pairs, (i) causing, by the server, at least one of the corresponding surrogate shopper mobile communication device or computing device and the corresponding remote shopper mobile communication device or computing device to display a notification of the matched pair, (ii) receiving, by the server, from an electronic system in the identified brick-and-mortar store or specified through surrogate shopper interaction with the corresponding surrogate shopper mobile communication device or computing device, a completion indicator identifying fulfillment by the corresponding surrogate shopper of the remote order paired therewith, and (iii) providing a reward to the corresponding surrogate shopper following receipt by the server of the completion indicator, the reward redeemable only against products or services offered for sale by the retail enterprise.

In another aspect, a method for reward-based surrogate shopping at a retail enterprise may comprise receiving, by a server of the retail enterprise, a plurality of remote orders each specified through interaction by a different one of a corresponding plurality of remote shoppers with an associated remote shopper mobile communication device or computing device, each of the plurality of remote orders including order parameters defining for purchase by a corresponding one of the plurality of remote shoppers one or more items offered for sale by the retail enterprise and at least one of a desired date and a desired time of day of fulfillment of the remote order, receiving, by the server, an assignment request specified through interaction by a surrogate shopper with a surrogate shopper mobile communication device or computing device, the assignment request including request parameters identifying one of a plurality of brick-and-mortar stores of the retail enterprise and at least one of a desired date and a desired time of day for fulfilling by the corresponding surrogate shopper of a remote order at the identified brick-and-mortar store, comparing, by the server, the plurality of received remote orders with the received assignment request and causing, by the server, the surrogate shopper mobile communication device or computing device to display each of the plurality of remote orders in which at least one of the order parameters matches at least one of the request parameters, receiving, by the server, a selected one of the displayed remote orders specified through interaction by the surrogate shopper with the surrogate shopper mobile communication device or computing device, receiving, by the server, from an electronic system in the identified brick-and-mortar store or specified through surrogate shopper interaction with the surrogate shopper mobile communication device or computing device, a completion indicator identifying fulfillment by the surrogate shopper of the selected remote order, and providing a reward to the surrogate shopper following receipt by the server of the completion indicator, the reward redeemable only against products or services offered for sale by the retail enterprise.

In yet another aspect, a method for reward-based surrogate shopping at a retail enterprise may comprise receiving, by a server of the retail enterprise, a remote order specified through interaction by a remote shopper with a remote shopper mobile communication device or computing device, the remote order including order parameters defining for purchase by the remote shopper one or more items offered for sale by the retail enterprise and at least one of a desired date and a desired time of day of fulfillment of the remote order, receiving, by the server, a plurality of assignment requests each specified through interaction by a different one of a plurality of surrogate shoppers with an associated surrogate shopper mobile communication device or computing device, each of the plurality of assignment requests including request parameters identifying one of a plurality of brick-and-mortar stores of the retail enterprise and at least one of a desired date and a desired time of day for fulfilling by the corresponding surrogate shopper of one or more remote orders at the identified brick-and-mortar store, comparing, by the server, the received remote order with the plurality of received assignment request and causing, by the server, the remote shopper mobile communication device or computing device to display each of the plurality of surrogate shoppers for which at least one of the assignment request parameters matches at least one of the order parameters, receiving, by the server, a selected one of the displayed surrogate shoppers specified through interaction by the remote shopper with the remote shopper mobile communication device or computing device, receiving, by the server, from an electronic system in the identified brick-and-mortar store or specified through interaction by the selected surrogate shopper with the selected surrogate shopper's mobile communication device or computing device, a completion indicator identifying fulfillment by the selected surrogate shopper of the remote order, and providing a reward to the selected surrogate shopper following receipt by the server of the completion indicator, the reward redeemable only against products or services offered for sale by the retail enterprise.

BRIEF DESCRIPTION OF THE DRAWINGS

This disclosure is illustrated by way of example and not by way of limitation in the accompanying figures. Where considered appropriate, reference labels have been repeated among the figures to indicate corresponding or analogous elements.

DETAILED DESCRIPTION OF THE DRAWINGS

Figure 1:
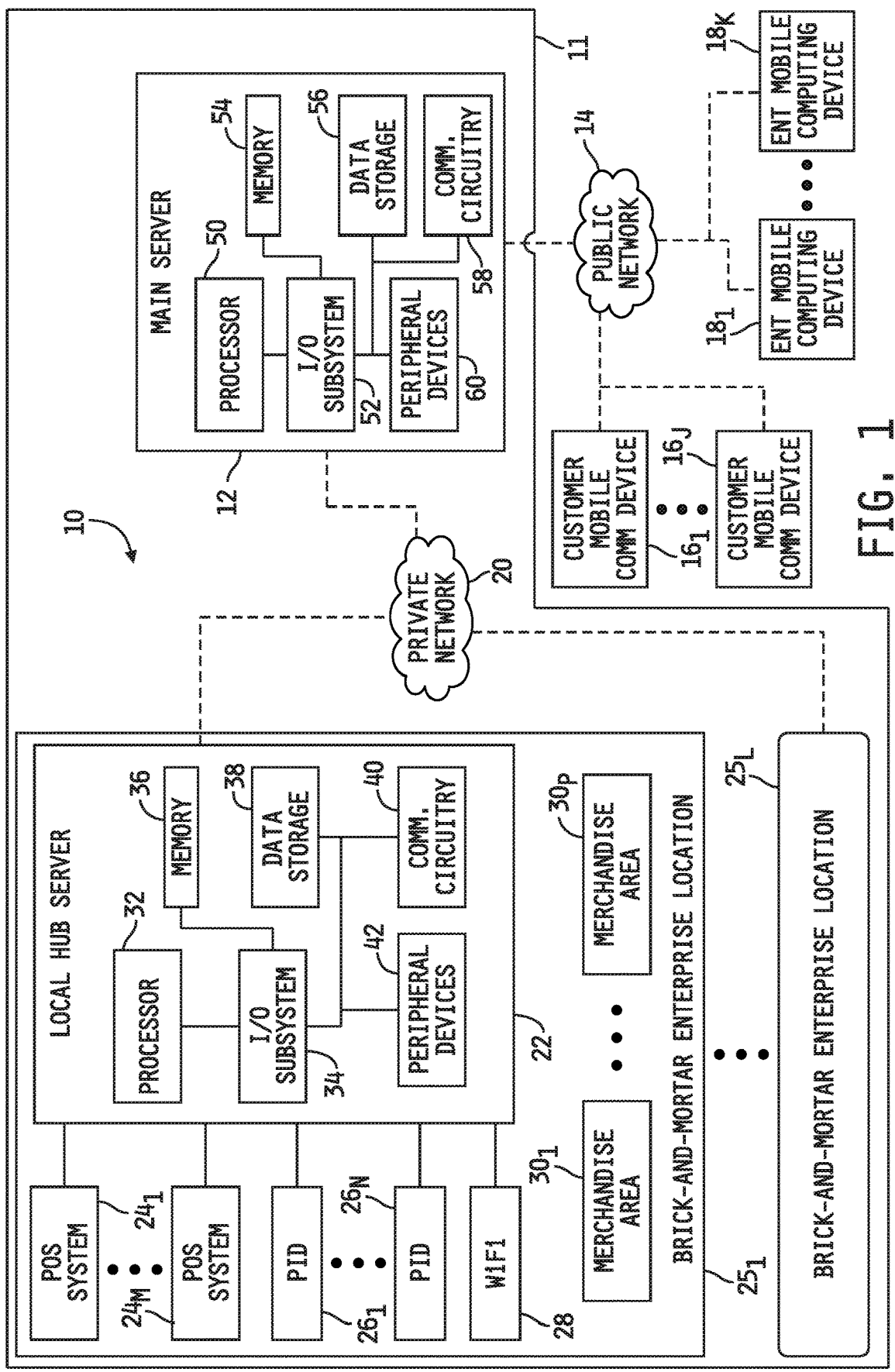
FIG. 1 is a simplified block diagram of an embodiment of a rewards-based surrogate shopping system for a retail enterprise.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases may or may not necessarily refer to the same embodiment. Further, when a particular feature, structure, process, process step or characteristic is described in connection with an embodiment, it is submitted that it is within the knowledge of one skilled in the art to effect such feature, structure, process, process step or characteristic in connection with other embodiments whether or not explicitly described. Further still, it is contemplated that any single feature, structure, process, process step or characteristic disclosed herein may be combined with any one or more other disclosed feature, structure, process, process step or characteristic, whether or not explicitly described, and that no limitations on the types and/or number of such combinations should therefore be inferred.

Embodiments of the invention may be implemented in hardware, firmware, software, or any combination thereof. Embodiments of the invention implemented in a computer system may include one or more bus-based interconnects between components and/or one or more point-to-point interconnects between components. Embodiments of the invention may also be implemented as instructions stored on one or more machine-readable media, which may be read and executed by one or more processors. A machine-readable medium should be understood to mean a non-transitory machine-readable medium, i.e., one that does not include transitory signals, and such a machine-readable medium may illustratively be embodied as any device or physical structure for storing or transmitting information in a form readable by a machine (e.g., a computing device). For example, a machine-readable medium may be embodied as any one or combination of read only memory (ROM); random access memory (RAM); magnetic disk storage media; optical storage media; flash memory devices; and others.

SYSTEM COMPONENTS

Referring now to FIG. 1, an embodiment of a rewards-based surrogate shopping system 10 for a retail enterprise 11 is shown. The system 10 includes a retail enterprise 11 having a main server 12 configured to communicate with electronic devices and/or systems of, and under the control of, remote and surrogate shoppers of the retail enterprise 11 via a public network 14, e.g., the Internet. In the illustrated embodiment, for example a number, J, of mobile communication devices $16_1$-$16_J$ are shown and a number, K, of computing devices $18_1$-$18_K$ are shown, wherein all such devices are configured to communicate with the main server 12, and vice versa, via the public network 14. Each such device $16_1$-$16_J$ and $18_1$-$18_K$ is configured to communicatively connect to the public network 14, and J and K may each be any positive integer. The retail enterprise 11 may include any number of brick-and-mortar retail outlets or stores $25_1$-$25_L$ each having one or more point-of-sale systems $24_1$-$24_M$ operating therein, wherein L may be any positive integer. The main server 12 is configured to communicate with each such point-of-sale (POS) system $24_1$-$24_M$, each of which operates in a conventional manner, to process items to be purchased by shoppers during purchase transactions, wherein M may be any positive integer. Each brick-and-mortar store may include any number, P, of merchandise areas $30_1$-$30_P$, e.g., areas where merchandise may be displayed for sale, wherein P may be any positive integer.

Each of the brick-and-mortar stores $25_1$-$25_L$ may further include at least one conventional WiFi Access Point 28 which may be coupled to a corresponding local hub server 22, or directly to the main server 12 in any one or more of the brick-and-mortar stores $25_1$-$25_L$ not having an associated local hub server 22. Each such WiFi Access Point 28 is illustratively controlled by the main server 12 (or corresponding local hub server 22) in a conventional manner to establish at least one corresponding Internet hotspot within the brick-and-mortar store 25 via which customers can access the public network 14, e.g., to access the Internet, using any conventional public network accessible electronic device and/or system, e.g., such as with any of the plurality of mobile communication devices $16_1$-$16_K$.

In some embodiments, the main server 12 illustratively hosts an enterprise member or membership services (EMS) program which may include or otherwise have access to a virtual coupon bank and/or a customer purchase history database containing purchase histories of one or more customers of the retail enterprise 11. As used herein, the term "enterprise member services program," "enterprise membership services program" or EMS and "shopper membership service" are interchangeable and refer to a shopper or customer service which may offer to customer members one or more services such as making available to customers one or more virtual discount coupons that may be redeemable by the retail enterprise against the purchase from the retail enterprise of various goods and/or services and/or tracking and maintaining customer purchase histories in a customer purchase history database accessible by the main server 12. In this regard, the terms "customer membership account" and "EMS account" are likewise interchangeable and refer to a platform via which the retail enterprise 11 may make available to customers one or more virtual discount coupons and/or by which a customer's purchase history and information about the customer can be maintained by the main server 12 in a database separately from purchase histories of and information about other customers. Further in this regard, the term "EMS identification code" or EMSID illustratively refers to at least one collection of letters, symbols and/or numbers that is different for, and therefore unique to, each customer member of the enterprise membership services program, and which is used to uniquely identify a customer's EMS account within the enterprise membership services program. In one embodiment, for example, the EMSID for each customer may be a unique, several-digit access code, although in other embodiments the EMSID may be or include more, fewer and/or different codes and/or may further include and a unique password.

As will be discussed in further detail below, the main server 12 illustratively includes an EMS module that manages and controls a customer-member interface, e.g., a web-based interface, to the EMS program via which customers can access and manage their individual EMS accounts. Illustratively, each customer may access their individual (and private from other customer-members) EMS account, i.e., their individual EMS page(s) within the web-based EMS interface, which may be referred to hereinafter as an "EMS website," by entering that customer's EMSID into a graphic user interface element of the web-based EMS interface. Therein, the customer may access, establish, modify and otherwise manage the customer's EMS account information including, for example, but not limited to, name, address, email address, mobile telephone number, photograph of the customer or the like.

In the embodiment illustrated in FIG. 1, the main server 12 is illustratively coupled via a private network 20 to a plurality of local hub servers 22, each associated with a different one of a plurality of brick-and-mortar enterprise locations $25_1$-$25_L$, wherein L may be any positive integer. Each local hub server 22 is coupled to one or more conventional point-of-sale systems, e.g., $24_1$-$24_M$. Each of the point-of-sale systems $24_1$-$24_M$ is configured to process items selected by customers for purchase and to process payment for such items. Some retail enterprises may include a single brick and mortar outlet, and other larger enterprises may include two or more physically remote brick and mortar stores. In the latter case, the retail enterprise may include, for example, a main physical location with two or more remote physical locations, and for purposes of this document the two or remote physical locations in such an arrangement are referred to as "hub" locations. In this disclosure, the system 10 will be illustrated and described in the context of such a larger retail enterprise having a main physical location and two or more physical hub locations. In this regard, the main server 12 in the system 10 shown in FIG. 1 will typically be located at a main business location of the retail enterprise, and will be coupled via the network 20 to two or more local hub servers 22, each of which will typically be located at a different one of two or more hub locations, e.g., each in the form of a brick-and-mortar store.

Each hub location may include any number of point-of-sale systems coupled to a corresponding local hub server, and in the embodiment illustrated in FIG. 1, for example, the local hub server 22 is communicatively coupled to "M" such point-of-sale systems $24_1$-$24_M$, where M may be any positive integer. Communicative coupling between the local hub server 22 and the one or more point-of-sale systems $24_1$-$24_M$ may be accomplished using any known communication coupling, and communications over any such hardwire and/or wireless coupling may be accomplished using any known communication protocol.

In some alternative embodiments of such a large retail enterprise, one or more of the local hub servers 22 may be omitted, and the main server 12 may be coupled directly, via the network 20, to one or more point-of-sale systems $24_1$-$24_M$ of any of one or more brick-and-mortar stores $25_1$-$25_L$, or the main server 12 may be omitted and at least one of the local hub servers 22 may be configured to act as a so-called master server with the remaining local hub servers 22 configured to act as so-called slave servers. In other alternative embodiments in which the retail enterprise 11 includes only a single brick and mortar outlet, the local hub servers 22 may be or include the main server 12 or vice versa. For purposes of the following description, any process disclosed as being controlled by the main server 12 may, in some embodiments, instead be controlled, in whole or in part, by one or more local hub servers 22 and vice versa, and/or may be controlled, in whole or in part, by one of the point-of-sale systems 24$_1$-24$_M$ and vice versa.

The local hub server 22 may be embodied as any type of server (e.g., a web server) or similar computing device capable of performing the functions described herein. In the illustrative embodiment of FIG. 1, the local hub server 22 includes a processor 32, an I/O subsystem 34, a memory 36, a data storage 38, a communication circuitry 40, and one or more peripheral devices 42. It should be appreciated that the local hub server 22 may include other components, sub-components, and devices commonly found in a server and/or computing device, which are not illustrated in FIG. 1 for clarity of the description.

The processor 32 of the local hub server 22 may be embodied as any type of processor capable of executing software/firmware, such as a microprocessor, digital signal processor, microcontroller, or the like. The processor 32 may be a single processor or include multiple processors. The I/O subsystem 34 of the local hub server 22 may be embodied as circuitry and/or components to facilitate input/output operations with the processor 32 and/or other components of the local hub server 22. The processor 32 is communicatively coupled to the I/O subsystem 34.

The memory 36 of the local hub server 22 may be embodied as or otherwise include one or more conventional volatile and/or non-volatile memory devices. The memory 36 is communicatively coupled to the I/O subsystem 34 via a number of signal paths. Although only a single memory device 36 is illustrated in FIG. 1, the local hub server 22 may include additional memory devices in other embodiments. Various data and software may be stored in the memory 36. The data storage 38 is also communicatively coupled to the I/O subsystem 34 via a number of signal paths, and may be embodied as any type of device or devices configured for the short-term or long-term storage of data such as, for example, memory devices and circuits, memory cards, hard disk drives, solid-state drives, or other data storage devices.

The communication circuitry 40 of the local hub server 22 may include any number of devices and circuitry for enabling communications between the local hub server 22 and the main server 12 and between the local hub server 22 and the one or more point-of-sale systems 24$_1$-24$_M$. In the illustrated embodiment, for example, communication between the local hub server 22 and the main server 12 takes place wirelessly via the network 20, wherein the network 20 may represent, for example, a private local area network (LAN), personal area network (PAN), storage area network (SAN), backbone network, global area network (GAN), wide area network (WAN), or collection of any such computer networks such as an intranet, extranet or the Internet (i.e., a global system of interconnected network upon which various applications or service run including, for example, the World Wide Web). In alternative embodiments, the communication path between the local hub server 22 and the main server 12 may be a non-private network and/or may be, in whole or in part, a wired connection. Generally, the communication circuitry 40 may be configured to use any one or more, or combination, of conventional secure and/or unsecure communication protocols to communicate with the main server 12. As such, the network 20 may include any number of additional devices, such as additional computers, routers, and switches, to facilitate communications between the local hub server 22 and the main server 12. Communication between the local hub server 22 and the one or more point-of-sale systems 24$_1$-24$_M$ may take place via one or more such wireless communication interfaces and/or via one or more conventional wired interfaces.

In some embodiments, the local hub server 22 may also include one or more peripheral devices 42. Such peripheral devices 42 may include any number of additional input/output devices, interface devices, and/or other peripheral devices. For example, the peripheral devices 42 may include one or more display monitors, one or more keyboards, one or more point-and-click devices, one or more audio processing circuits, and/or other input/output devices.

Other local hub servers, e.g., serving other brick-and-mortar locations 25$_1$-25$_L$, may be substantially similar to the local hub server 22 and include similar components. As such, the description provided above of the components of the local hub server 22 may be equally applicable to such similar components of other local hub servers and are not repeated herein so as not to obscure the present disclosure. Of course, it should be appreciated that in some embodiments one or more of the local hub servers 22 and may be dissimilar to others of the local hub servers 22.

An embodiment of the main server 12 is also illustrated in FIG. 1, and generally includes the same components as the local hub server 22. For example, a processor 50 is coupled to an I/O subsystem 52, and the I/O subsystem 52 is coupled to a memory 54, a data storage unit 56, communication circuitry 58 and one or more peripheral devices 60. In some embodiments, each of the foregoing components may be identical to corresponding components of the local hub server 22 described above, and a detailed explanation of such components will not be repeated here for brevity. In other embodiments, the main server 12 may be configured differently than the local hub server 22 described above. In any case, the communication circuitry 40 of each of the local hub servers 22 facilitates communication with the communication circuitry 58 of the main server 12 and vice versa so that information can be shared between the main server 12 and each of the one or more local hub servers 22 via the network 20. Although only one such main server 12 is shown in FIG. 1, it should be appreciated that, in other embodiments, the system 10 may include any number of shopper main servers, and in still other embodiments the main server 12 may be communicatively coupled to one or more remote servers of the retail enterprise. Any such one or more remote servers may include any structure or feature illustrated and described herein with respect to the main server 12, and may be configured to execute any one or more functions described with respect to the main server 12 either alternatively to the main server 12 or in addition to the main server 12. In any case, the main server 12 may be embodied as any type of server (e.g., a web server) or similar computing device capable of performing the functions described herein.

The mobile communication devices 16$_1$-16$_J$ illustrated in FIG. 1 are intended to depict mobile communication devices each separately owned and/or operated by a different surrogate or remote shopper of the retail enterprise 11. No limit on the total number of such mobile communication devices 16$_1$-16$_J$ that may be owned and operated by any one such shopper, or on the total number of such mobile communication devices 16$_1$-16$_J$ that may communicate with the main server 12, is intended or should be inferred. The computing devices 18$_1$-18$_K$ illustrated in FIG. 1 are intended to depict conventional computing devices each separately owned, leased or otherwise operated by a different surrogate or remote shopper of the retail enterprise 11. No limit on the total number of such computing devices $18_1$-$18_K$ that may communicate with the main server 12, is intended or should be inferred.

The mobile communication devices $16_1$-$16_J$ may be or include any mobile electronic device capable of executing one or more software application programs as described herein and of communicating with the main server 12 via the public network 14. Examples of the mobile communication devices $16_1$-$16_J$ include, but should not be limited to, mobile phones generally, e.g., cellular, satellite, voice over internet protocol (VOIP) phones, etc., smart phones, tablet computers, personal data assistants (PDAs), wearable electronic communication devices, including eye glasses, watches, devices attached to and/or integral with clothing, headwear and/or footwear, implanted electronic communication devices, and the like. The computing devices $18_1$-$18_K$ may be or include any conventional computing device capable of executing one or more software application programs as described herein and of communicating with the main server 12 via the public network 14. Examples of the computing devices $18_1$-$18_K$ include, but should not be limited to, personal, fixed-location, e.g., desktop or workstation, computers (PCs), and mobile computing devices such as laptop computers, notebook computers, netbook computers, tablet computers, and the like, whether or not networked with one or more other computing devices Also depicted in FIG. 1 are conventional position identification devices (PIDs) $26_1$-$26_N$ each illustratively communicatively coupled to the local hub server 22 in a different one of the brick-and-mortar enterprise locations $25_1$-$25_L$ such that each brick-and-mortar enterprise location includes one or more such position identification devices $26_1$-$26_N$, wherein N may be any positive integer. In alternate embodiments, one or more of the PIDs $26_1$-$26_N$ may not be communicatively coupled to the local hub server 22.

In one embodiment, the position identification devices $26_1$-$26_N$ are provided in the form of conventional electronic wireless signal broadcasting devices 224, e.g., conventional radio frequency broadcasting beacons, for the purpose of broadcasting radio signals carrying information corresponding to the location and/or identity thereof. The position identification devices $26_1$-$26_N$ will, for purposes of this disclosure, be described as being implemented in the form of such wireless signal broadcasting devices, although it will be understood that one or more of the position identification devices $26_1$-$26_N$ may alternatively take other forms, examples of which will be described at the end of this document.

In one embodiment, the wireless signal broadcasting devices $26_1$-$26_N$ in each of the plurality of brick-and-mortar enterprise locations $25_1$-$25_L$ are distributed and located throughout the brick-and-mortar location such that each broadcasts wireless signals from different locations throughout the brick-and-mortar enterprise location 25. In some embodiments, the wireless signal broadcasting devices $26_1$-$26_N$ are mounted or placed sequentially in rows and columns within and throughout each brick-and-mortar enterprise location $25_1$-$25_L$. In other embodiments, one or more wireless signal broadcasting devices $26_1$-$26_N$ may be placed only at one more specific locations in or at each of the plurality of brick-and-mortar enterprise locations $25_1$-$25_L$, e.g., at one or more store entrances/exits, at one or more of the point-of-sale systems $24_1$-$24_M$, at one or more of the merchandise areas $30_1$-$30_P$, etc. In any case, each such wireless signal broadcasting device $26_1$-$26_N$ is configured to periodically broadcast one or more unique wireless identification signals, i.e., one or more identification signals that distinguish the particular wireless signal broadcasting device 26 from other wireless signal broadcasting devices 26, from which the location thereof can be determined or otherwise ascertained by the main server 12.

In some embodiments, the wireless signal broadcasting devices $26_1$-$26_N$ are each configured to periodically broadcast wireless identification signals in the radio frequency (RF) range, although any of the one or more wireless signal broadcasting devices $26_1$-$26_N$ may be configured to alternatively broadcast wireless identification signals in one or more other frequency ranges. In any case, the wireless signal broadcasting devices $26_1$-$26_N$ are further each illustratively configured to broadcast wireless identification signals with a predefined broadcast range and/or orientation (i.e., direction).

Illustratively, the unique wireless identification signals broadcast by each wireless signal broadcasting device $26_1$-$26_N$ carry decodable information in the form of a unique identification code (UID). Generally, the UID of each wireless signal broadcasting device $26_1$-$26_N$ uniquely identifies that wireless signal broadcasting device and distinguishes that wireless signal broadcasting device from all other wireless signal broadcasting devices within the retail enterprise 11 or at least those located in any one brick-and-mortar enterprise location 25. As will be described in greater detail below, the location of any wireless signal broadcasting device $26_1$-$26_N$ is determinable by the main server 12 by comparing the corresponding UID to stored UID location data, such that the brick-and-mortar store $25_1$-$25_L$ at or in which the wireless signal broadcasting device is located is identifiable by the main server 12, and/or such that the location of the wireless signal broadcasting device within a brick-and-mortar store is identifiable by the main server 12. Those skilled in the art will recognize additional and/or alternative information that may be included within or appended to the UID, and/or carried by the unique wireless identification signals broadcast by the wireless signal broadcasting devices $26_1$-$26_N$, and it will be understood that any such additional and/or alternative information is contemplated by this disclosure.

MOBILE COMMUNICATION DEVICES

Figure 2:
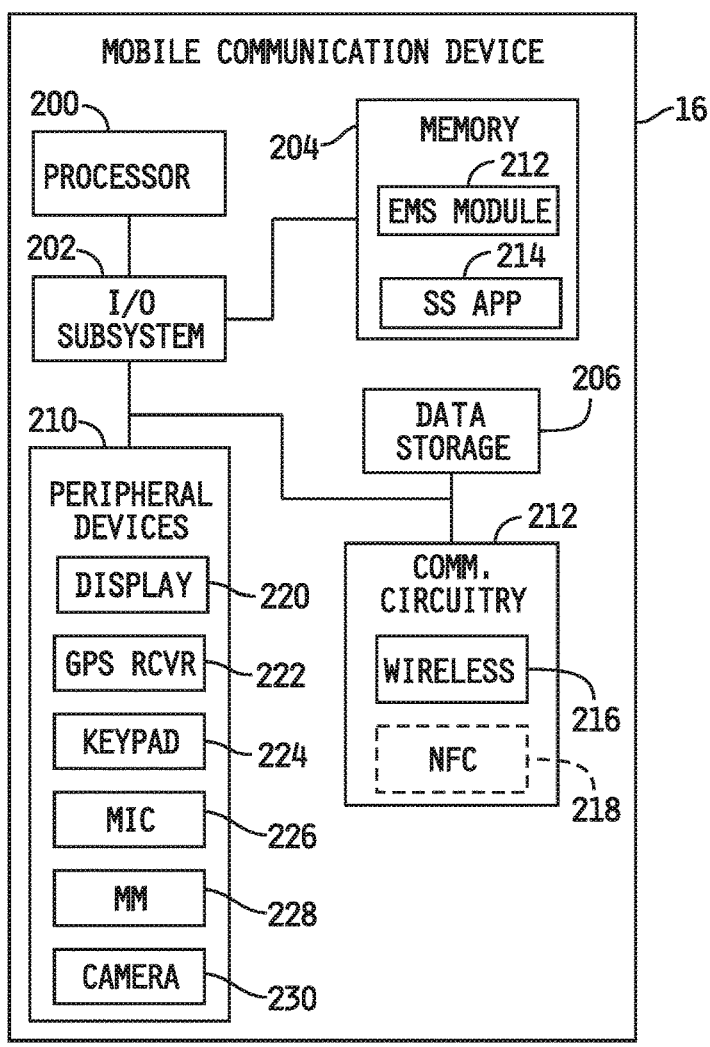
FIG. 2 is a simplified block diagram of an embodiment of one of the mobile communication devices illustrated in FIG. 1.

Referring now to FIG. 2, an embodiment of one of the mobile communication devices 16 illustrated in FIG. 1 is shown, which illustratively includes components similar to the main server 12 and also to the one or more local hub servers 22 and the one or more POS systems $24_1$-$24_M$. In the illustrated embodiment, the mobile communication device 16 includes a processor 200, an I/O subsystem 202, a memory 204, a data storage device 206, communication circuitry 212 and a number of peripheral devices 210. In some embodiments, each of the foregoing components may be identical to corresponding components of the local hub server 22 and interconnected as described above, and a detailed explanation of such components will not be repeated here for brevity. In other embodiments, any of the one or more mobile communication devices $16_1$-$16_J$ may be configured differently than the local hub server 22 described above. It will be appreciated that the mobile communication device 16 may include other components, sub-components, and devices commonly found in a mobile communication and/or computing device.

The memory 204 illustratively includes an EMS module 212 in the form of, e.g., instructions executable by the processor 200 to communicate EMS customer-member information to and from the main server 12, to control one or more local peripheral devices to facilitate communications between customer-members of the enterprise membership service (EMS) program and the main server 12 and to facilitate customer input of customer-identifying information, e.g., an EMS identifying number and/or code (EM-SID), and/or customer input of other information. For mobile communication devices 16 used by surrogate shoppers, the memory 204 further illustratively includes a downloaded surrogate shopper (SS) application 214, e.g., in the form of instructions executable by the processor 200 to facilitate user set-up of information identifying and establishing the user to the main server 12 as a surrogate shopper, to facilitate requesting and scheduling of surrogate shopping assignments, to facilitate carrying out of surrogate shopping assignments at one or more of the brick-and-mortar enterprise stores $25_1$-$25_L$ and, in some embodiments, to facilitate receipt and/or management of rewards for completion of surrogate shopping assignments. An example embodiment of the SS application 214 will be described in greater detail hereinafter with respect to FIGS. 6-10.

The communication circuitry 212 illustratively includes conventional wireless communication circuitry 216. In some embodiments, the wireless communication circuitry 216 is configured to conduct and facilitate cellular telephone communications with other cellular and land-based communication devices. In some embodiments, the wireless communication circuitry 216 is configured to conduct and facilitate communication with the main server 12 via the network 14. In some embodiments, the wireless communication circuitry 216 is configured to access the network 14 via at least one hotspot established in any of the brick-and-mortar stores $25_1$-$25_L$ by a corresponding at least one WiFi Access Point 28. In some embodiments, the wireless communication circuitry 216 may further be configured to conduct and facilitate communication with one or more of the position identification devices $26_1$-$26_N$ in any of the brick-and-mortar stores $25_1$-$25_L$. The wireless communication circuitry 216 may illustratively include conventional communication circuitry for conducting and facilitating any such communication, and examples of such conventional communication circuitry include, but are not limited to, one or more conventional radio frequency (RF) transceivers configured to receive and transmit signals at multiple radio frequencies, one or more conventional modem or other communication circuits configured to access and conduct communications via the Internet, and the like. The mobile communication device 16 may illustratively use any suitable communication protocol via the network 14 or other network to communicate with the main server 12, with other cellular and land-based communication devices and/or with one or more of the position identification devices $26_1$-$26_N$ in any of the brick-and-mortar stores $25_1$-$25_L$.

The communication circuitry 212 may, in some embodiments, optionally include conventional near-field communication circuitry 218 as illustrated by dashed-line representation. In such embodiments, the near-field communication circuitry 218 is illustratively configured to communicate with a near-field sensor or interface of another electronic device or system to transfer, upon contact or near-contact therewith, information from the mobile communication device 16 to the other electronic device or system and/or vice versa In addition to, or alternatively to, the number of peripheral devices 40 of the local hub server 22 described above, the number of peripheral devices 210 of the mobile communication device 16 may include any number of other or additional peripheral or interface devices. Examples of such additional peripheral devices illustrated in FIG. 2 include, but should not be limited to, a conventional visual display unit or screen 220, a conventional global positioning system (GPS) receiver 222, a conventional camera 230, a conventional keypad 224, a conventional microphone 226 and a conventional magnetometer 228. The display 220 is configured, in a conventional manner, to be responsive to instructions produced by the processor 200 to display information thereon. The GPS receiver 222 is configured, in a conventional manner, to receive radio-frequency signals transmitted by earth-orbiting satellites and to produce corresponding signals from which geographical coordinates of the receiver 222 are or can be determined. The camera 230 is configured, in a conventional manner, to capture images and/or video and to display the same on the display 220. The keypad 224 is configured, in a conventional manner, to provide signals corresponding to manual selection and activation thereof to the processor 200, and the microphone 226 is configured, in a conventional manner, to capture sound waves and to provide signals corresponding thereto to the processor 200. The magnetometer 228 is configured, in a conventional manner, to detect local geomagnetic fields, to produce magnetic signature signals based thereon and to provide such signals to the processor 200.

COMPUTING DEVICES

Figure 3:
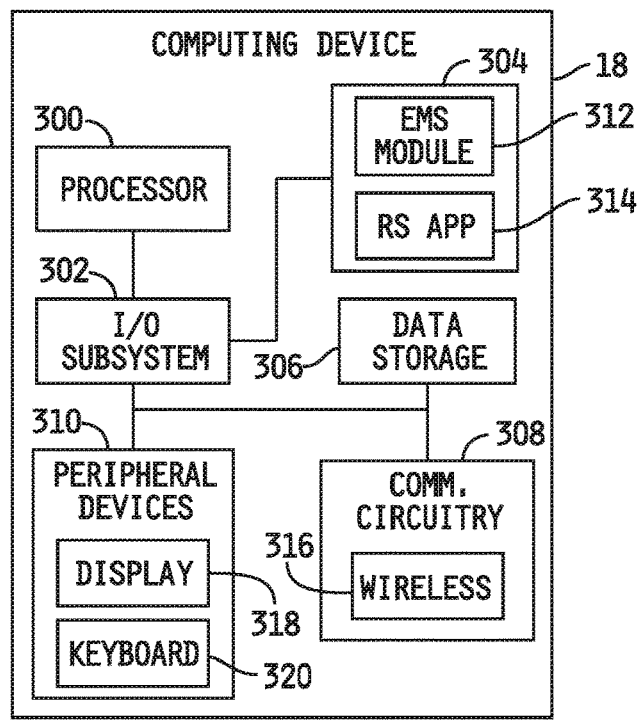
FIG. 3 is a simplified block diagram of an embodiment of one of the computing devices illustrated in FIG. 1.

Referring now to FIG. 3, an embodiment of one of the computing devices 18 illustrated in FIG. 1 is shown, which illustratively includes components similar to the main server 12 and also to the one or more local hub servers 22 and the one or more POS systems $24_1$-$24_M$ such as a processor 300, an I/O subsystem 302, a memory 304, a data storage device 306, communication circuitry 308 and a number of peripheral devices 310. In some embodiments, each of the foregoing components may be identical to corresponding components of the local hub server $22_1$ and/or POS system 24 described above, and a detailed explanation of such components will not be repeated here for brevity. In other embodiments, any of the one or more computing devices $18_1$-$18_K$ may be configured differently than the local hub server 22 described above. It will be appreciated that the computing devices 18 may include other components, subcomponents, and devices commonly found in a conventional computer and/or other computing device.

The memory 304 illustratively includes an EMS module 312 and a remote shopper (RS) module including an RS application 314 in the form of, e.g., instructions executable by the processor 300 to facilitate customer identification of preferred surrogate shoppers, if any, to facilitate requesting of remote orders and selection of surrogate shoppers to fulfill such remote orders, to facilitate advance payment for such remote orders and, in some embodiments, to facilitate customer rating of surrogate shopper performance. Alternatively or additionally, the RS application 314 may be provided in the form of an application downloadable customer mobile communication devices 16, e.g., in the form of instructions executable by the processor 200 to facilitate remote shopping by customers of the retail enterprise. An example embodiment of the RS application 314 executable by the processor 300 of a computing device 18 will be described in greater detail hereinafter with respect to FIGS. 6-10, although it will be understood that in other embodiments the example RS application may be executable by the processor 200 of a remote shopper's mobile communication device 16.

The communication circuitry 308 illustratively includes conventional wireless communication circuitry 316. In some embodiments, the wireless communication circuitry 316 is configured to conduct and facilitate wireless communications with other computing and/or communication devices. In some embodiments, the wireless communication circuitry 316 is configured to conduct and facilitate communication with the main server 12 via the network 14. The wireless communication circuitry 316 may illustratively include conventional communication circuitry for conducting and facilitating any such communication, and examples of such conventional communication circuitry include, but are not limited to, one or more conventional radio frequency (RF) transceivers configured to receive and transmit signals at multiple radio frequencies, one or more conventional modem or other communication circuits configured to access and conduct communications via the Internet, and the like. The communication circuitry 308 further illustratively includes conventional communication circuitry configured to communicate with other networks. The mobile communication device 16 may illustratively use any suitable communication protocol via the network 14 or other network to communicate with the main server 12 and/or with other electronic devices or systems.

In addition to, or alternatively to, the number of peripheral devices 40 of the local hub server 22 described above, the number of peripheral devices 310 of the mobile communication device 18 may include any number of other or additional peripheral or interface devices. Examples of such an additional peripheral devices illustrated in FIG. 3 includes, but should not be limited to, a conventional visual display monitor, unit or screen 318 and a conventional keyboard or keypad 320.

MAIN SERVER ENVIRONMENT

Figure 4:
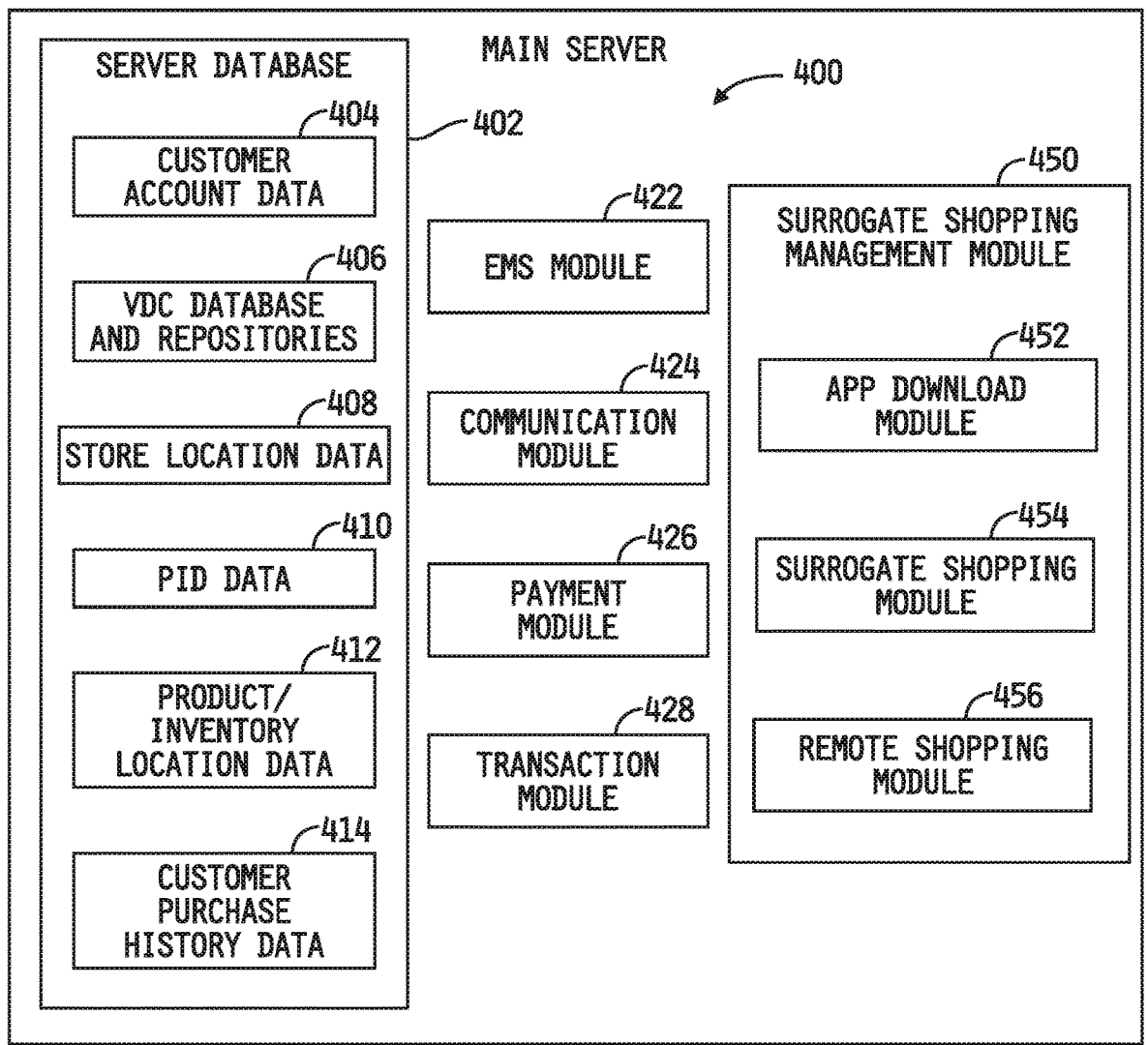
FIG. 4 is a simplified block diagram of an embodiment of an environment of the main server of FIG. 1.

Referring now to FIG. 4, a simplified block diagram is shown of an embodiment of an environment 400 of the main server 12 illustrated in FIG. 1. In the embodiment shown in FIG. 4, the environment 400 includes a server database 402 which illustratively includes customer account data 404, virtual discount coupon database including a plurality of virtual discount coupon repositories 406, store location data 408, PID data 410, product/inventory location data 412 and customer purchase history data 414.

Customers may elect to participate in an enterprise membership services (EMS) program offered, managed and maintained by the retail enterprise 11, by establishing a user account (referred to herein as an "EMS account" or "customer account") within the server 12, which user account may in some cases be an individual account accessible only by an individual person, e.g., an individual customer, and in other cases may be a group or "household" account accessible by each of a plurality of members of a predefined group of persons, e.g., members of a family or household, one or more employees of a business enterprise, etc. The terms "customer, "member," "customer member" and "household," and variants thereof, are used interchangeably in the following description, and such terms should be understood to refer interchangeably to an individual customer or a predefined group of individual customers (referred to herein as a "household") who shop at and purchase items from a retail enterprise, and who are members of an enterprise membership service (EMS) of the type described herein and provided and managed by the retail enterprise 11.

Illustratively, a software application program is available for download from the main server 12 via the public network 14 for shoppers electing to access the EMS program via their mobile communication device, e.g., one of the mobile communication devices $16_1$-$16_J$ and/or via their computing device, e.g., one of the computing devices $18_1$-$18_K$. Once downloaded and activated, shoppers can access and manage their EMS account and program features via the software application program executed by their mobile communication device $16_1$-$16_J$ and/or computing devices $18_1$-$18_K$. Illustratively, the main server 12 additionally hosts and controls an EMS website accessible via the public network 14, and in such embodiments shoppers can access and manage their EMS accounts and program features by accessing their EMS page(s) of the EMS website hosted by the main server 12 via a computing device $18_1$-$18_K$ and/or via their mobile communication device $16_1$-$16_J$ if the latter is equipped with a web browser.

In the illustrated embodiment, the customer account data 404 of the server database 402 has stored therein information relating to user accounts and profile data for each of the members of the EMS program. As customers join the EMS program, the server 12 establishes an EMS account within the customer account data 404 that is unique to the customer, and assigns to the customer, and/or the customer selects, a unique, corresponding enterprise membership services identification code, EMSID, as briefly described hereinabove. The EMSID associated with each customer is entered into the server 12 is stored along with the customer's profile data in the customer account data 404, and can be used thereafter to access the customer's EMS account. The customer account data 404 illustratively further includes additional information relating to the various customer-members of the EMS program. Examples of such additional information include, but are not limited to, customer name, customer address, communication information (CI) of a mobile communication device 16 carried by the customer, and the like. In one embodiment, the communication information (CI) may be or include the telephone number of the customer's mobile communication device 16. In other embodiments, the communication information (CI) may be or include a serial number, electronic identification code or other communication identifier associated with the customer's mobile communication device 16. In still other embodiments, the communication information (CI) may be or include, in place of or in addition to a telephone number or communication identifier of the customer's mobile electronic device, one or more other unique mobile electronic device identification codes that identify the specified mobile electronic device 16 for purposes of wireless communication therewith. In any case, all such customer identity information is illustratively associated, i.e., linked or mapped together, in the customer account data 402 such that a search of one customer identity parameter stored in the database 402 will provide access to all other identity and/or other parameters associated with that customer in the database 402.

In some embodiments, the EMSID may be provided on or as part of one or more of a shopper's ID card, an ID associated with an RFID tag, which RFID tag may be part of the NFC communication circuitry of the mobile communication device $16_1$, a shopper's incentive card, or the like. In other embodiments, the EMSID may not be provided in or as part of any tangible form, and may instead be or include one or more easily remembered sequences of numbers, letters, symbols or other characters. In any case, customer members of the EMS program described herein may scan or otherwise communicate or enter via a keypad or touchscreen their EMSID at one of the point-of-sale terminals $24_1$-$24_M$ and it is through the customer's EMSID that the main server 12 makes virtual discount offers available to the customer and/or associates purchases made by the customer with the customer's stored purchase history to thereby monitor and track purchases made by the customer from the retail enterprise 11 during purchase transactions. MPERKS®, a virtual customer coupon collection and redemption program offered to customers by Meijer, Inc. of Grand Rapids, Mich., is an example of one such EMS program of the type described herein, although it will be appreciated that any retail enterprise membership service which offers virtual discount coupons and/or other benefits to shopper members, and/or which tracks items purchased by shopper members during item purchase transactions at point-of-sale systems or terminals may be alternatively be used.

The virtual discount coupon (VDC) database 406 is illustratively configured to store a plurality of virtual discount coupons therein, and the database 406 further illustratively includes a plurality of virtual discount coupon repositories each associated with a different EMS customer and each configured to hold one or more virtual discount coupons for the sole use and redemption by that EMS customer.

The store location data 408 in the server database 402 illustratively has stored therein reference location information identifying geographical locations of the various brick-and-mortar stores $25_1$-$25_L$. In some embodiments, the store location data 408 includes information relating to various physical locations within each brick-and-mortar location 25. In some embodiments, the store location data 408 may alternatively or additionally include physical and/or product location information identifying various product display areas or other physical locations within the brick-and-mortar location 25. In still other embodiments, the store data 408 may alternatively or additionally include topographical map, planogram or other such data, some or all of which may be in graphical form, corresponding to one or more locations or areas within each of the brick-and-mortar locations 25.

The PID data 410 illustratively has stored therein PID identity information for each position identification device $26_1$-$26_N$ in the retail enterprise 11 as well as additional information from which the processor 50 can determine, for each device $26_1$-$26_N$, the identity of the brick-and-mortar location 25 at which each such device is located and/or the location or position within a brick-and-mortar location at which the wireless signal broadcasting device is located. In some embodiments, the PID location data 410 may illustratively contain information about each device $26_1$-$26_N$ in the retail enterprise 11 including, for example, unique identification codes (UID) of each PID provided in the form of a wireless signal broadcasting device $26_1$-$26_N$. In some embodiments, the PID location data 410 may include additional information including, for example, but not limited to, positional information corresponding to the coordinates of some or all of the PIDs which are embodied as wireless signal broadcasting devices $26_1$-$26_N$ of the retail enterprise 11 and/or of one or more brick-and-mortar locations thereof, relative to one or more sets of base coordinates.

The product/inventory location data 412 illustratively has stored therein location information identifying locations of merchandise displayed for sale within each brick-and-mortar location 25.

The customer purchase history data 414 illustratively includes a history for each EMS customer member and has stored therein historical information relating to the products and/or services purchased by that customer member over time.

The environment 400 of the main server 12 further includes an EMS module 420 and a communication module 422. The EMS module 420 is configured to control and manage EMS-related activity of shopper members of the EMS program. The communication module 424 is configured, in a conventional manner, to control and manage all communications between the main server 12 and the local hub servers 22 in embodiments that include the local hub servers 22, and to control and manage all communications between the main server 12 and all point-of-sale systems $24_1$-$24_M$, in embodiments that do not include a local hub server 22. The communication module 422 is further configured, in a conventional manner, to control and manage all wireless communications conducted between the main server 12 and the mobile communication devices $16_1$-$16_J$ and $18_1$-$18_K$. The communication module 424 is illustratively configured, in a conventional manner, to control and manage all communication between the main server 12 and any external electronic device or system, examples of which include the one or more mobile communication devices $16_1$-$16_J$, the one or more computing devices $18_1$-$18_K$, the one or more point-of-sale systems $24_1$-$24_M$, the one or more local hub servers 22 and, in some embodiments, the PIDs $26_1$-$26_N$.

The environment 400 of the main server 12 further includes a payment module 426 and a transaction module 428. The payment module 426 is illustratively configured, in a conventional manner, to process tangible forms of electronic payment systems (EPS), e.g., tangible electronic funds transfer instruments such as credit cards, debit cards, etc., used at the point-of-sale systems $24_1$-$24_M$, and/or used at a conventional web-accessible product/service purchase interface controlled by or for the main server 12, to purchase items from the retail enterprise 11. The transaction module 428 is illustratively configured, in a conventional manner, to control processing of sales transactions at each of the point-of-sale systems $24_1$-$24_M$ and/or at a web-accessible product/service purchase interface controlled by or for the main server 12.

Figure 6:
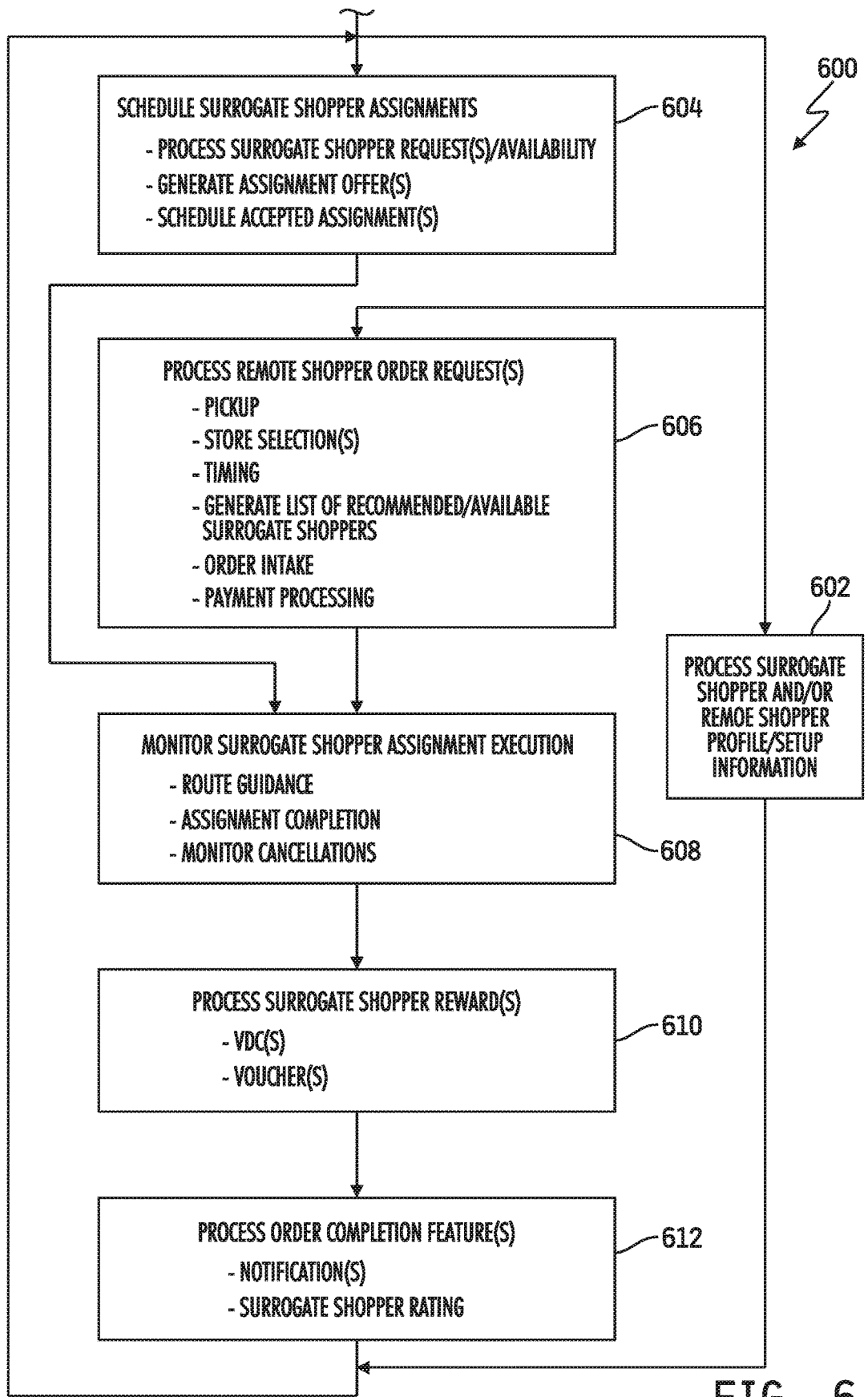
FIG. 6 is a simplified flow diagram of an embodiment of a process for matching surrogate shoppers with remote shoppers, monitoring execution of surrogate shopping assignments and providing corresponding rewards to surrogate shoppers earned by completing surrogate shopping assignments.
Figure 7A:
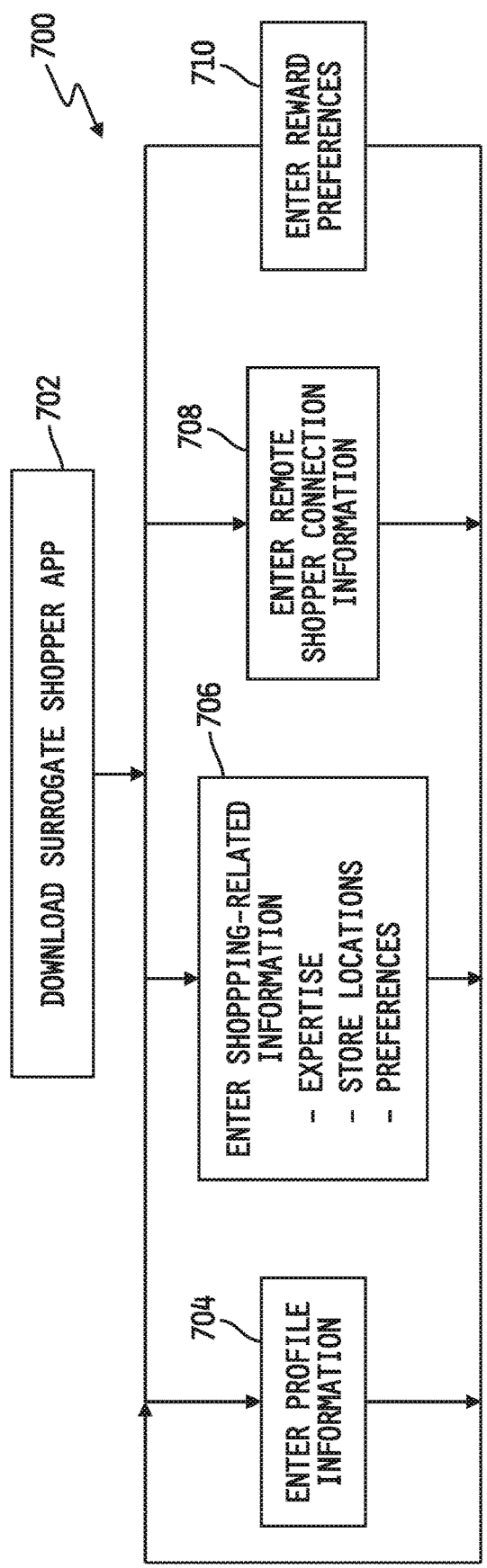
FIG. 7A is a simplified flow diagram of an embodiment of a process for acquiring and setting up a surrogate shopper application on a mobile communication device.
Figure 7B:
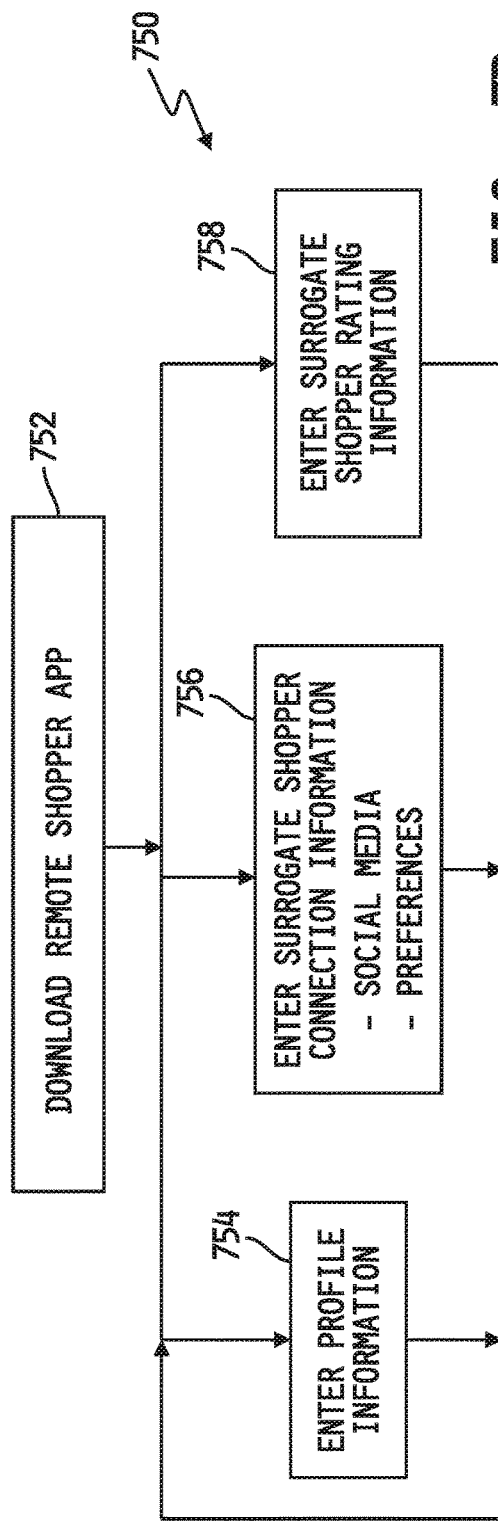
FIG. 7B is a simplified flow diagram of an embodiment of a process for acquiring and setting up a remote shopper application on a computing device and/or a mobile communication device.

The environment 400 of the main server 12 further includes a surrogate shopping management module 450 which illustratively includes an application download module 452, a surrogate shopping module 454 and a remote shopping module 456. The surrogate shopping module 456 is illustratively operable to manage and control the surrogate shopping process described in detail herein. Example embodiments of processes executed by the surrogate shopping module 454 are illustrated in FIGS. 6, 7A, 8 and 10, and such processes will be described in detail hereinafter. The remote shopping module 456 is illustratively operable to manage and control the remote shopping process described in detail herein. Example embodiments of processes executed by the remote shopping module 456 are illustrated in FIGS. 6, 7B and 9, and such processes will be described in detail hereinafter.

OPERATION OF WIRELESS SIGNAL BROADCASTING DEVICES

Figure 5:
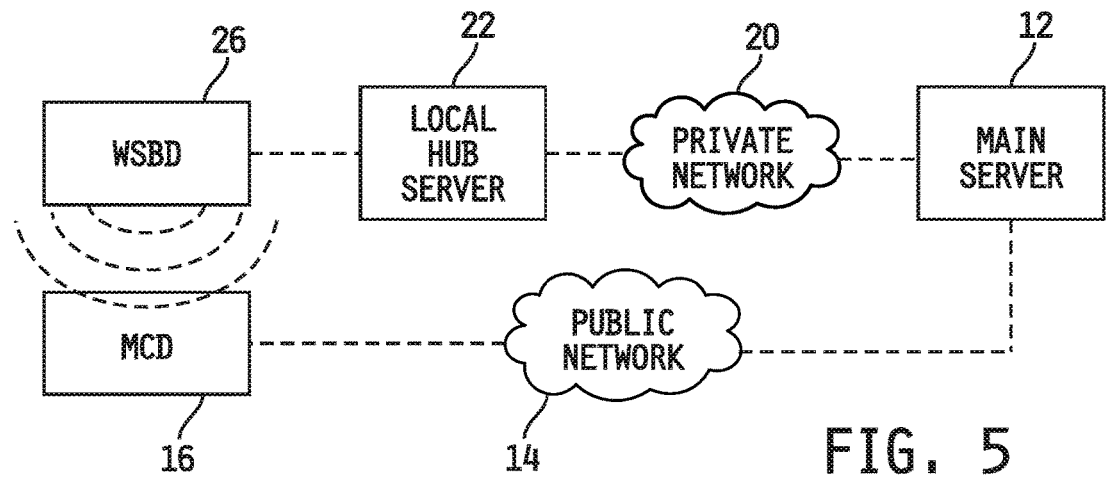
FIG. 5 is a simplified diagram of a communications framework for detecting by a mobile communication device of wireless signals produced by wireless signal broadcasting devices located in a brick-and-mortar store of a retail enterprise, and for conducting wireless communications relating thereto between the mobile communication device and the main server of the retail enterprise.

Referring now to FIG. 5, a simplified diagram is shown of a communications framework for detecting by customer mobile communication devices $16_1$-$16_J$ of wireless signals produced by any of the plurality of wireless signal broadcasting devices (WSBD) $26_1$-$26_N$ located at or within any of the plurality of brick-and-mortar enterprise locations $25_1$-$25_L$, and for communicating the received signals or information carried by or otherwise relating to such signals between the customer mobile communication devices $16_1$-$16_J$ and the main server 12 of the retail enterprise 11. As described hereinabove with respect to FIG. 1, each of the wireless communication devices $26_1$-$26_N$ fixedly located at or in any of the brick-and-mortar enterprise locations is operable to broadcast one or more unique wireless identification signals. At some point, while the wireless communication devices $26_1$-$26_N$ are broadcasting one or more unique wireless signals, a mobile communication device 16 may approach a location at which one or more of the wireless communication devices $26_1$-$26_N$ is/are positioned. This scenario is depicted in FIG. 5 which illustrates one such wireless communication device 26 mounted or otherwise placed in a fixed position at or within one of the brick-and-mortar enterprise locations $25_1$-$25_L$, and broadcasting unique wireless signals as represented in FIG. 5 by the semi-circular dashed lines emanating outwardly from the wireless signal broadcasting device 26.

In the illustrated example, the wireless signal broadcasting device 26 is communicatively coupled to the main server 12 via the private network 20 and via one of the local hub servers 22. The mobile electronic device 16 and the main server 12 are each illustratively configured to communicate wirelessly with each other via the public network 14. As the mobile communication device 16 approaches the fixed location of the wireless signal broadcasting device 26, the mobile communication device 16 enters the broadcast range of the wireless signal broadcasting device 26 as depicted in FIG. 5. When within the broadcast range of the wireless signal broadcasting device 26, the mobile communication device 16 is operable to detect the unique identification signals (UID) being broadcast by the wireless signal broadcasting device 26. Illustratively, the broadcast range of the wireless signal broadcasting device 26 is sufficiently large, wide and/or oriented so as to be detectable by mobile communication devices $16_1$-$16_J$ during normal movement of mobile communication devices $16_1$-$16_J$ into and/or within the brick-and-mortar enterprise locations $25_1$-$25_L$, while is at the same time sufficiently small, narrow and/or oriented so as to provide a desired amount or degree of resolution in determining the location of a mobile communication device 16 relative to one or a subset of the wireless signal broadcasting devices $26_1$-$26_N$ positioned at or within any of the brick-and-mortar enterprise locations $25_1$-$25_L$. Generally, the broadcast range of any of the wireless signal broadcasting devices $26_1$-$26_N$ positioned at or within any of the brick-and-mortar enterprise locations $25_1$-$25_L$ should be understood to be defined by an area relative to the wireless signal broadcasting device 26 within which the signal strength of wireless signals broadcast thereby is sufficient to be detected by the communication circuitry 38 of the mobile communication devices $16_1$-$16_J$, and outside of which the signal strength of wireless signals broadcast thereby is undetectable by the communication circuitry 38 carried by the mobile communication devices $16_1$-$16_J$. As used in the previous sentence, the term "undetectable" should be understood to mean any of indistinguishable by the communication circuitry 38 of the mobile communication devices $16_1$-$16_J$ from background electromagnetic noise, distinguishable by the communication circuitry 38 of the mobile communication devices $16_1$-$16_J$ from background electromagnetic noise but not decodable by the communication circuitry 38 of the mobile communication devices $16_1$-$16_J$ or distinguishable by the communication circuitry 38 of the mobile communication devices $16_1$-$16_J$ from background electromagnetic noise but not decodable by communication circuitry of any electronic device or system to which the communication circuitry 38 of the mobile communication devices $16_1$-$16_J$ may transmit or otherwise relay the wireless broadcast signal(s). In any case, the general communication framework illustrated in FIG. 5 is used in some of the processes illustrated and described below for detecting by mobile communication devices $16_1$-$16_J$ of wireless signals produced by any of the plurality of wireless signal broadcasting devices $26_1$-$26_N$ located at or within any of the plurality of brick-and-mortar enterprise locations $25_1$-$25_L$ and for conducting wireless communications between such mobile communication devices $16_1$-$16_J$ and the main server 12 of the retail enterprise 11.

DEFINITIONS OF TERMS AND PHRASES DESCRIBING THE FLOW DIAGRAMS

As will be described in greater detail below with respect to the flow diagrams, the processor 200 of one or more mobile communication devices $16_1$-$16_J$ and the processor 50 of the main server 12 are each illustratively operable to communicate with each other via conventional wireless communications. During such communications, phrases such as "the processor 200 is operable to wirelessly transmit to the processor 50," "the processor 200 is operable to wirelessly transmit to the main server 12, "the MCD 16 is operable to wirelessly transmit to the processor 50" and "the MCD 16 is operable to wirelessly transmit to the main server 12" should be understood to mean that the processor 200 of the mobile communication device 16 is operable to control the communication circuitry 212 thereof to wirelessly transmit information to the processor 50 of the main server 12 via the communication circuitry 58 of the main server 12, and that the processor 50 of the main server 12 is operable to receive via the communication circuitry 58 the information wirelessly transmitted thereto. Likewise phrases such as "the processor 50 is operable to wirelessly transmit to the processor 200," "the processor 500 is operable to wirelessly transmit to the MCD 16, "the main server 12 is operable to wirelessly transmit to the processor 200" and "the main server 12 is operable to wirelessly transmit to the MCD 16" should be understood to mean that the processor 50 of the main server 12 is operable to control the communication circuitry 58 thereof to wirelessly transmit information to the processor 200 of an MCD 16 via the communication circuitry 212 thereof, and that the processor 200 of the MCD 16 is operable to receive the information wirelessly transmitted thereto.

In some instances, wireless transmission of information from a mobile communication device 16 to the main server 12 illustratively includes information provided by the user of the mobile communication device 16 through manipulation of one or more data input devices carried by the mobile communication device 16. In this regard, phrases such as "through interaction with the mobile communication device 16" or "interacts with the mobile communication device 16" should be understood to mean that the user, which may a surrogate shopper or remote shopper, physically controls one or more of the peripheral devices 210 of the mobile communication device 16 in a conventional manner to select or otherwise supply one or more signals or other items of data to be included in the information to be wirelessly transmitted by the mobile communication device 16 to the main server 12. Examples include, but are not limited to, selecting data via a touch-screen display 220, supplying data via selection of keys on the keypad 224, supplying one or more images via control of the camera 230, supplying one or more sound bites via control of the microphone 226, and the like.

In some embodiments, information relating to completion by a surrogate shopper of a surrogate shopping assignment may be provided to the main server 12 by an electronic device or system communicatively coupled to the main server 12 via the private network 20, e.g., directly or via one of the local hub servers 22. In this regard, phrases such as "through interaction with the" electronic device or system or "interacts with the" electronic device or system should be understood to mean that the surrogate shopper or an employee of, or independent contractor associated with, the retail enterprise, physically controls, in a conventional manner, one or more electronic devices or systems that is/are communicatively coupled to the main server 12 via the private network 20 to select or otherwise supply one or more signals or other items of data to the main server 12 that is/are indicative of confirmation of completion by the surrogate shopper of a surrogate shopping assignment. Examples include, but are not limited to, selecting data via a touchscreen display, supplying data via selection of keys on a keypad or keyboard and/or supplying one or more sound bites via control of a microphone associated with one of the point-of-sale systems $24_1$-$24_M$, a peripheral device 42 associated with a local hub server 22, and the like.

SURROGATE SHOPPING PROCESS

Referring now to FIG. 6, a simplified flow diagram is shown of an embodiment of a process 600 via which individuals can earn rewards by shopping for customers of the retail enterprise 11 who cannot or do not wish to shop in-person at any of the brick-and-mortar stores $25_1$-$25_L$. In the following description, such individuals who shop for customers of the retail enterprise 11 at a brick-and-mortar store 25 will be referred to as surrogate shoppers, and customers for whom such surrogate shopping is being done will be referred to as remote shoppers. In the embodiment illustrated in FIG. 6, the process 600 illustratively includes matching surrogate shoppers with remote shoppers, monitoring and/or facilitating execution by surrogate shoppers of surrogate shopping assignments and providing rewards to surrogate shoppers earned by completing surrogate shopping assignments. As will be described in detail below, the process 600 is illustratively executed in part by the processor 50 of the main server 12, in part by the processor 200 of a mobile communication device carried by a surrogate shopper and in part by the processor 300 of a computing device 18 (or a processor 200 of a mobile communication device 16) operated by a remote shopper.

In the illustrated embodiment, the process 600 begins at step 602 where the processor 50 of the main server 12 is operable to process surrogate shopper and/or remote shopper profile and setup information. Referring to FIG. 7A, an example surrogate shopper profile and setup process 700 executed at step 602 of the process 600 is shown. In one embodiment, the process 700 is carried out on and by a mobile communication device 16 and executed, at least in part, by the processor 200 carried thereby. In other embodiments, at least some of the steps of the process 700 may alternatively be carried out on and by a computing device 18, e.g., via a web-based interface controlled by or for the main server 12, although for purposes of this disclosure the process 700 will be described as being carried out by the surrogate shopper using the surrogate shopper's mobile communication device 16. In any case, the process 700 begins at step 702 where an individual desiring to conduct surrogate shopping downloads from the server 12 and installs on that individual's mobile communication device 16 a surrogate shopper application 214. In some embodiments, such downloading of the surrogate shopping application may be controlled, at least in part, by the processor 50 of the main server 12 in accordance with instructions stored in the application download module 452. In other embodiments, the surrogate shopping application may be stored elsewhere, and downloading thereof may be controlled, at least in part, by an external device and/or system. In any case, following step 702, profile information may be entered or updated by the surrogate shopper at step 704.

In some embodiments, surrogate shoppers are be required to be or to become customer-members of the EMS program controlled and managed by or for the main server 12 as described above. In such embodiments, the surrogate shopper's profile information may be automatically populated at step 704 with information contained in the surrogate shopper's customer account data 404. In other embodiments, surrogate shoppers are not required to be or to become customer-members of the EMS program, and in such embodiments the profile information may be manually entered into the SS application 214 via conventional interactions by the surrogate shopper with the surrogate shopper's mobile communication device 16. In any case, the surrogate shopper may enter, change, update or otherwise modify the surrogate shopper's profile information for the SS application 214 at step 704 by interacting with the surrogate shopper's mobile communication device 16 in a conventional manner, and the processor 200 of the mobile communication device 16 is operable to execute such information entry/changes and wirelessly transmit the same to the main server 12. The processor 50 of the main server 12 is, in turn, operable to execute such entries and/or changes by establishing surrogate shopper profile information in the customer account database 404 if the customer is not an EMS member or by modifying the surrogate shopper's profile information in the account database 404 if the customer is an EMS member.

Alternatively or in addition to step 704, the process 700 may advance to step 706 where the surrogate shopper may illustratively enter information specific to the surrogate shopper and/or surrogate shopping preferences, e.g., one or more conditions upon which the surrogate shopper is willing to execute surrogate shopping assignments. Example information that may be entered by the surrogate shopper at step 706 may include, but is not limited to, one or more departments or product areas of the retail enterprise 11 in which the surrogate shopper has particular knowledge or expertise, e.g., electronics, sporting goods, gluten-free foods, vegetarian or vegan foods, etc., identification of one or more of the brick-and-mortar stores $25_1$-$25_L$ typically frequented by the surrogate shopper, identification of one or more brick-and-mortar stores $25_1$-$25_L$ and/or geographic locations outside of the surrogate shopper's home area that the surrogate shopper periodically or otherwise visits, and the like. Example surrogate shopper preferences that may be entered by the surrogate shopper at step 706 may include, but is not limited to, identification of one or more of the brick-and-mortar stores $25_1$-$25_L$ and/or store locations at which the surrogate shopper is willing to execute surrogate shopping assignments, day(s) of the week and/or time(s) of day on and at which the surrogate shopper is available to execute surrogate shopping assignments, minimum and/or maximum size of, e.g., number of items in, remote orders for which the surrogate shopper will be willing to execute surrogate shopping assignments, a service rate, e.g., in the form of a minimum or specific reward, which may or may not be related to or a function of remote order size, remote shopper identity, store location, day of the week, time of day, etc., at and for which the surrogate shopper will be willing to execute surrogate shopping assignments, and the like. In any case, the processor 50 of the main server 12 may take any such information entered by the surrogate shopper at step 706 into account when generating surrogate shopping assignments and/or recommendations as described by example with respect to FIGS. 8 and 9. Those skilled in the art will recognize other information and/or preferences that may be entered by the surrogate shopper at step 706, and it will be understood that any such other information and/or preferences may be additionally or alternatively taken into account by the processor 50 of the main server 12 when generating surrogate shopping assignments and/or recommendations.

Alternatively or in addition to either of steps 704 and 706, the process 700 may advance to step 708 where the surrogate shopper may illustratively enter information relating to any connections the surrogate shopper may have with one or more remote shoppers. For example, the surrogate shopper may be acquainted with one or more known remote shoppers, and in such cases the surrogate shopper may identify any such known remote shoppers at step 708 as remote shoppers for whom the surrogate shopper is willing to execute surrogate shopping assignments. In some embodiments, the surrogate shopper may utilize one or more social media resources to identify one or more social media contacts as known or potential remote shoppers. In one embodiment of step 708, the setup interface may include, for example, a selectable graphic user interface (GUI) element which the surrogate shopper may select to include as known or potential remote shoppers any or all persons connected to the surrogate shopper via one or more social media platforms, e.g., the surrogate shopper may designate any social media "friends," "followers" and/or other connections. In any case, the processor 50 of the main server 12 may take any such information entered by the surrogate shopper at step 706 into account when generating surrogate shopping assignments and/or recommendations as described by example with respect to FIGS. 8 and 9. Those skilled in the art will recognize other remote shopper connection information that may be entered by the surrogate shopper at step 708, and it will be understood that any such other information may be additionally or alternatively taken into account by the processor 50 of the main server 12 when generating surrogate shopping assignments and/or recommendations.

Alternatively or in addition to any of steps 704, 706 and 708, the process 700 may advance to step 710 where the surrogate shopper may illustratively enter information relating to one or more reward preferences. In embodiments which include step 710, examples of reward preferences specifiable by the surrogate shopper at step 710 may include, but are not limited to, an election to receive rewards generated or selected by the main server 12, an election to receive rewards selectable by the surrogate shopper from a pool of rewards, an election to receive rewards redeemable by the retail enterprise only against one or more selected product brands, an election to receive rewards in the form of credit usable against selectable or specified products or services offered for sale by the retail enterprise, e.g., general merchandise, food, fuel, medical prescriptions and/or other pharmaceutical items, photo developing services, etc., an election to receive rewards in the form of accruable or accumulatable credits usable at any time or upon accumulation of a specific dollar amount against selectable products or services offered for sale by the retail enterprise, an election to receive rewards in the form of credits giftable to other customer-members of the EMS program, an election to receive rewards in the form of perks redeemable and receivable during surrogate and/or personal shopping expeditions at any of the brick-and-mortar stores, e.g., complementary coffee while shopping, no-waiting checkout, preferential parking, etc., and the like. In any case, the processor 50 of the main server 12 may take any such reward preferences entered by the surrogate shopper at step 710 into account when generating rewards for completion of surrogate shopping assignments as described by example with respect to FIG. 6. Those skilled in the art will recognize other reward preferences that may be entered by the surrogate shopper at step 710, and it will be understood that any such other reward preferences may be additionally or alternatively taken into account by the processor 50 of the main server 12 when generating rewards for completion of surrogate shopping assignments.

Any of steps 704, 706, 708 and 710 may illustratively be executed by the surrogate shopper at any time to update or otherwise modify any of the entered information. In any case, all such information is wirelessly transmitted by the mobile communication device 16 to the main server 12, and the processor 50 is operable to store all such surrogate shopper information in the database 402, e.g., in the customer account data 404.

Referring now to FIG. 7B, an example remote profile and setup process 750 executed at step 602 of the process 600 is shown. In one embodiment, the process 750 is carried out on and by a computing device 18 and executed in part by the processor 300 thereof and in part by the processor 50 of the main server 12. In alternative embodiments, the process 750 may be carried out on an by a mobile communication device 16 and executed, at least in part, by the processor 200 carried thereby, although for purposes of this disclosure the process 750 will be described as being carried out by the remote shopper using a communication device 18 accessed by the remote shopper. In any case, the process 750 begins at step 752 where an individual desiring to remotely shop at the retail enterprise shopping downloads from the server 12 and installs on that individual's computing device 18 a remote shopper, or in which the individual accesses a web-based remote shopper interface controlled by or for the main server 12. In any case, following step 752, profile information may be entered or updated by the remote shopper at step 754.

In some embodiments, remote shoppers are be required to be or to become customer-members of the EMS program controlled and managed by or for the main server 12 as described above. In such embodiments, the remote shopper's profile information may be automatically populated at step 754 with information contained in the remote shopper's customer account data 404. In other embodiments, remote shoppers are not required to be or to become customer-members of the EMS program, and in such embodiments the profile information may be manually entered at step 754 via conventional interactions by the remote shopper with the remote shopper's computing device 18. In any case, the remote shopper may enter, change, update or otherwise modify the remote shopper's profile information at step 754 by interacting with the remote shopper's computing device 18 in a conventional manner, and the processor 50 of the main server 12 is operable to store/update such information in the remote shopper's customer account data 404.

Alternatively or in addition to step 754, the process 750 may advance to step 756 where the remote shopper may illustratively enter information relating to any connections the remote shopper may have with one or more surrogate shoppers and/or one or more surrogate shopper preferences. For example, the remote shopper may be acquainted with one or more known surrogate shoppers that the remote shopper is willing to entrust with surrogate shopping duties, and in such cases the remote shopper may identify any such known surrogate shoppers at step 756. As another example, the remote shopper may utilize one or more social media resources at step 756 to identify one or more social media contacts as known or potential surrogate shoppers. In one embodiment of step 756, the setup interface may include, for example, a selectable graphic user interface (GUI) element which the remote shopper may select to include as known or potential surrogate shoppers any or all persons connected to the remote shopper via one or more social media platforms, e.g., the remote shopper may designate any social media "friends," "followers" and/or other connections. Surrogate shopper preferences illustratively relate to identifiable surrogate shoppers and/or one or more specifiable traits or characteristics of surrogate shoppers which the remote shopper would like to execute surrogate shopping assignments. Examples of surrogate shopper preferences that may be entered by remote shoppers at step 756 include, but are not limited to, one or more surrogate shopper identified by name or other designator, surrogate shoppers having a place of residence within a specified distance of the remote shopper's residence, surrogate shoppers above a specified age, below a specified age and/or within a specified age range, surrogate shoppers having a rating better than a specified threshold rating, identification of, and agreement to pay, a premium rate for one or more specified surrogate shoppers, and the like. One example premium rate, which should not be considered limiting in any way, may illustratively take the form of an enhanced reward, additional reward, tip or the like, whereby the processor 50 of the main server 12 will be operable to use or add the premium rate to or in addition to rewards otherwise provided by the processor 50 to such surrogate shopper(s) upon completion of surrogate shopping assignments for the remote shopper. In some embodiments, the magnitude of any such premium rate may illustratively be made dependent upon one or more factors relating any remote order to be fulfilled by an identified surrogate shopper, such as the size of the remote order, the number of remote orders fulfilled by the identified surrogate shopper within a specified time period, the day of the week and/or the time of day of fulfillment by the identified surrogate shopper of the remote order, the speed of fulfillment by the identified surrogate shopper of the remote order, the availability of the surrogate shopper to fulfill the remote order on the requested day and/or at a requested time of day, the current rating of the surrogate shopper, the rate requested or specified by the surrogate shopper, if any, the reward preferences of the surrogate shopper, and the like. In any case, the processor 50 of the main server 12 may take any such information entered by the remote shopper at step 705 into account when generating surrogate shopping assignments and/or recommendations as described by example with respect to FIGS. 8 and 9. Those skilled in the art will recognize other surrogate shopper connection information and/or preferences that may be entered by the remote shopper at step 756, and it will be understood that any such other connection information and/or preferences may be additionally or alternatively taken into account by the processor 50 of the main server 12 when generating surrogate shopping assignments and/or recommendations.

Alternatively or in addition to either of steps 754 and 756, the process 750 may advance to step 758 where the remote shopper may illustratively enter surrogate shopper rating information to rate the performance of a surrogate shopper after the remote shopper has received a remote order that was fulfilled by the surrogate shopper. In some embodiments, the processor 50 of the main server 12 may take such surrogate shopper ratings into account when generating surrogate shopping assignments and/or recommendations as described by example with respect to FIGS. 8 and 9. Alternatively or additionally, such surrogate shopper ratings may be presented to remote shoppers for use as one criteria by which a remote shopper may select a surrogate shopper from multiple surrogate shoppers that are available to fulfill a remote order requested by the remote shopper. Those skilled in the art will recognize other evaluative information about surrogate shoppers that may be entered by the remote shopper at step 758, and it will be understood that any such other information may be additionally or alternatively taken into account by the processor 50 of the main server 12 when generating surrogate shopping assignments and/or recommendations and/or presented to remote shoppers for use selecting surrogate shoppers for surrogate shopping assignments.

Any of steps 754, 756 and 758 may illustratively be executed by the remote shopper at any time to update or otherwise modify any of the entered information. In any case, all such information is transmitted to or otherwise captured by the main server 12, and the processor 50 is operable to store all such remote shopper information in the database 402, e.g., in the customer account data 404.

Referring again to FIG. 6, the process 600 further includes steps 604 and 606 which are illustratively executable in parallel to interactively match shopping assignments for surrogate shoppers with remote orders requested by remote shoppers. In this regard, step 604 generally provides for the scheduling of surrogate shopper assignments, and step 606 generally provides for the processing of remote shopper order requests. In the example illustrated in FIG. 6, the processor 200 of the surrogate shopper's mobile communication device 16 and the processor 50 of the main server 12 illustratively cooperate at step 604 to process surrogate shopper requests and availability and, in some embodiments, to generate surrogate shopping assignment offers and/or schedule accepted surrogate shopping assignments. The processor 300 of the remote shopper's computing device 300 and the processor 50 of the main server 12 likewise illustratively cooperate at step 606 to process remote order details, such as the order itself, order fulfillment timing store selection and order pickup details and, in some embodiments, to generate a list of recommended/available surrogate shoppers based on the remote shopper's requests and/or to process payment for the remote shopper's order.

In some embodiments of steps 604 and 606, a surrogate shopper desiring a surrogate shopping assignment may select from a list, generated by the processor 50 of the main server 12, of assignments for remote orders that match the surrogate shopper's specified assignment request parameters. In other embodiments of steps 604 and 606, a remote shopper placing a remote order may select a surrogate shopper from a list, generated by the processor 50 of the main server 12, of available surrogate shoppers that match the remote shopper's remote order request parameters. In still other embodiments of steps 604 and 606, surrogate shoppers desiring surrogate shopping assignments may be provided with at least some amount of selectivity among remote orders that match their assignment request parameters, and remote shoppers placing remote orders may likewise be provided with at least some amount of selectivity among surrogate shoppers that match their remote order request parameters. In yet other embodiments of steps 604 and 606, the processor 50 of the main server 12 may match available surrogate shoppers with current or pending remote order requests without providing either of the surrogate and remote shoppers with selectivity of the other. Still further embodiments of the steps 604 and 606 may include various combinations of the foregoing example embodiments.

Figure 8:
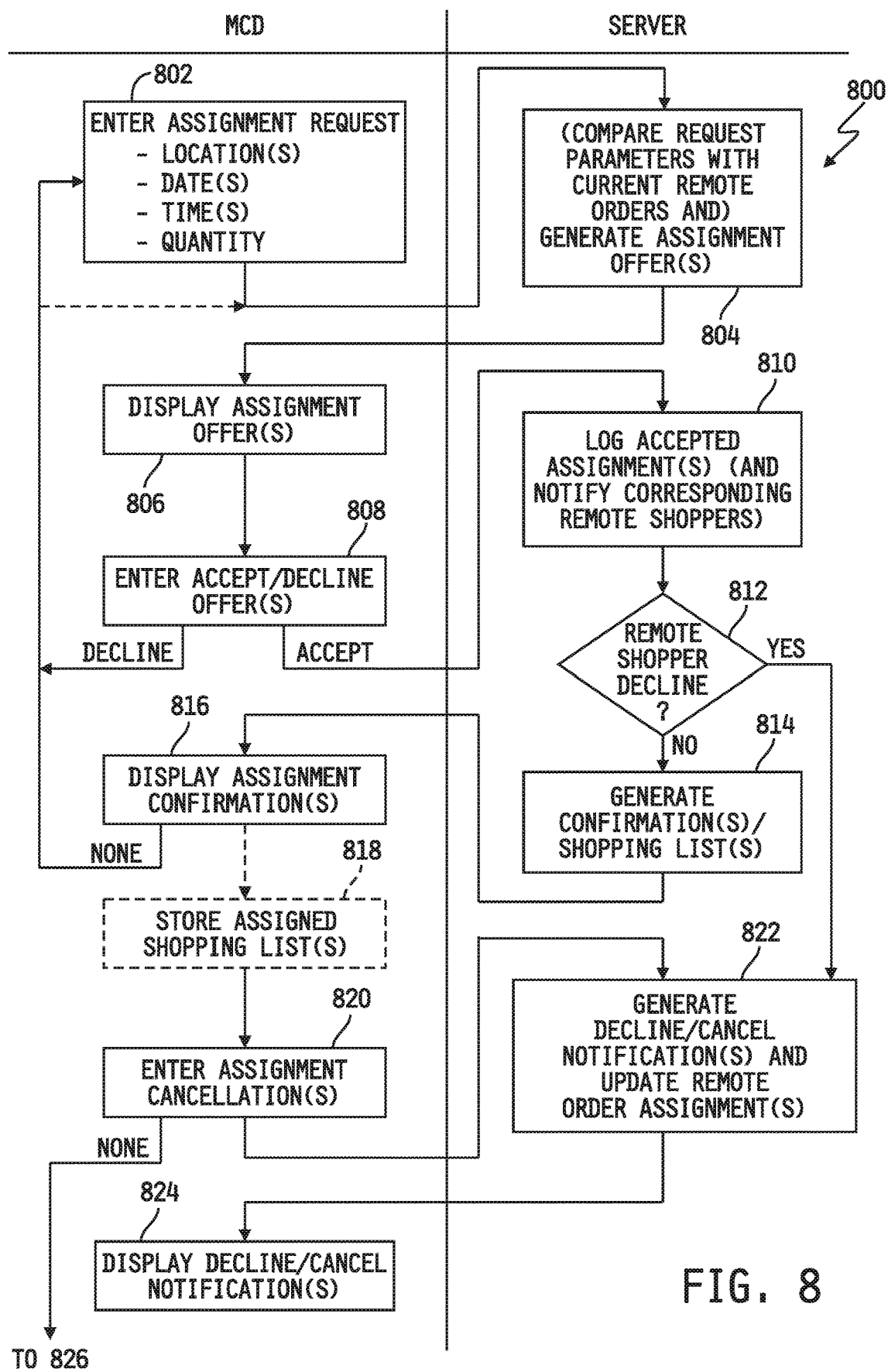
FIG. 8 is a simplified flow diagram of an embodiment of a process for requesting by surrogate shoppers of surrogate shopping assignments and for matching such surrogate shoppers with remote shoppers.
Figure 9:
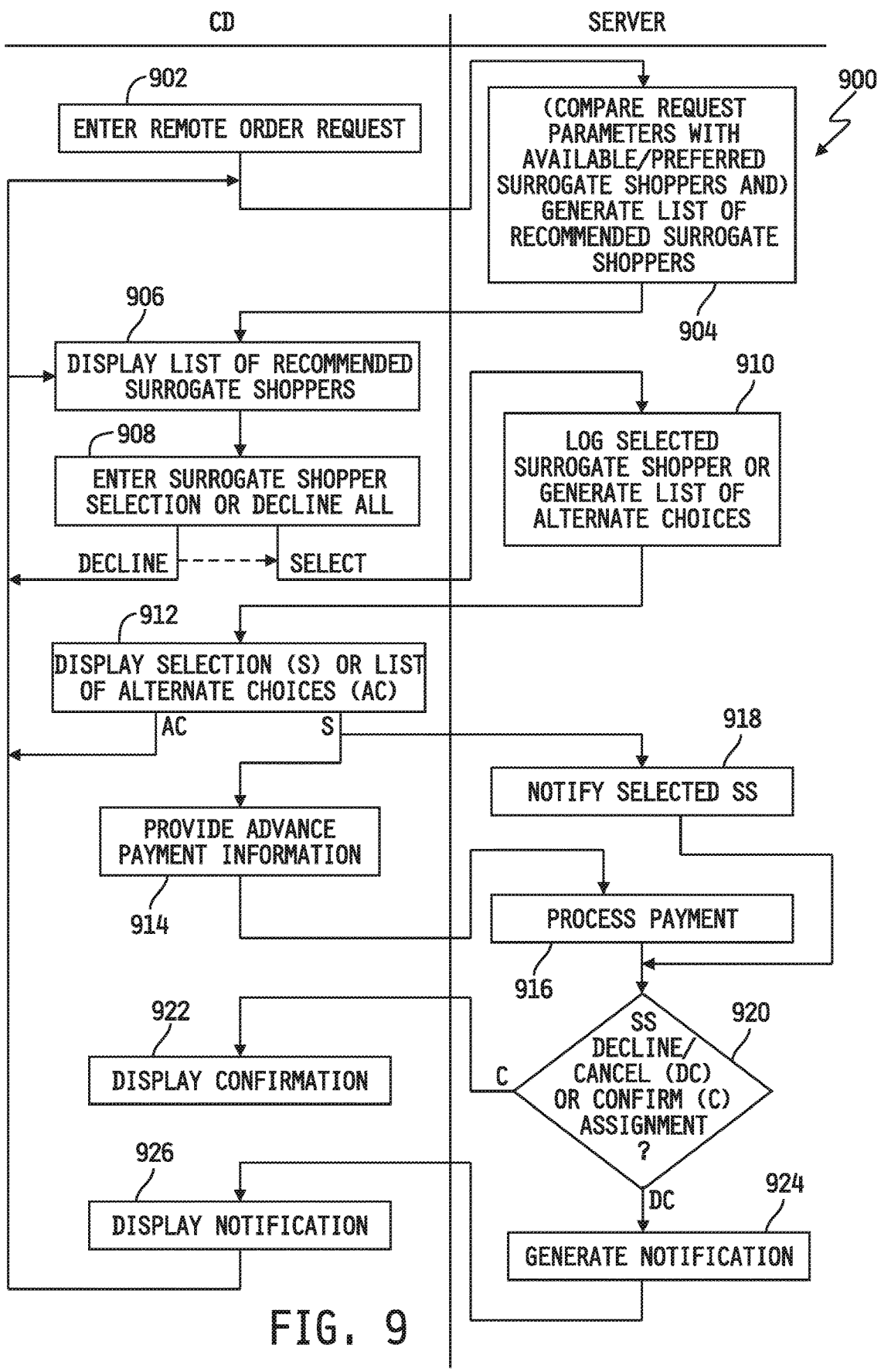
FIG. 9 is a simplified flow diagram of an embodiment of a process for remotely ordering items from a retail enterprise by remote shoppers and for matching such remote shoppers with surrogate shoppers.

FIGS. 8 and 9 depict simplified flow diagrams of example processes for executing steps 604 and 606 respectively of the surrogate shopping process of FIG. 6. It will be understood that not all embodiments of step 604 will include all of the steps of the process illustrated in FIG. 8 and/or that not all embodiments of step 606 will include all of the steps of the process illustrated in FIG. 9. Rather, the flow diagrams illustrated in FIGS. 8 and 9 depict generalized processes that are intended to encompass various embodiments of steps 604 and 606 such as those just described in the previous paragraph, and in this regard it will be understood that different implementations of steps 604 and 606 of the surrogate shopping process 600 of FIG. 6 may use different subsets of the steps of the processes illustrated in FIGS. 8 and 9 respectively. Following the description of the generalized processes illustrated in FIGS. 8 and 9, examples of different implementations of the steps 604 and 606 of the surrogate shopping process 600 will be described in the context of the flow diagrams illustrated in FIGS. 8 and 9, and each such example will include a discussion of the corresponding steps depicted in FIG. 8 that may be included/omitted and of the steps depicted in FIG. 9 that may be included/omitted.

Referring now to FIG. 8, a simplified flow diagram is shown of an embodiment of a generalized process 800 for executing step 604 of the process 600 illustrated in FIG. 6. As indicated by the framework of the process 800 illustrated in FIG. 8, a portion of the process 800, i.e., the portion to the left of the central vertical line and centered under the heading "MCD," illustratively represents one or more software applications executed by the processor 200 of a surrogate shopper's mobile communication device 16, i.e., one of the mobile communication devices $16_1$-$16_J$ associated in the customer account data 404 with a customer member of the EMS program or, in some embodiments, with an individual that is not a customer member of the EMS program but has previously downloaded and set up the surrogate shopper (SS) application. This portion of the process 800 illustratively is or includes the SS application module 214 stored in the memory 204 (and/or data storage 206) of the surrogate shopper's mobile communication device 16. The SS application is, as described above, illustratively stored in the form of instructions executable by the processor 200 of the surrogate shopper's mobile communication device 16. In some alternative embodiments, the process 800 illustrated in FIG. 8 may be executed by a computing device 18 used by the surrogate shopper, and in such embodiments the surrogate shopper application will be installed in whole or in part on the surrogate shopper's computing device 18. In other alternative embodiments, the process 800 illustrated in FIG. 8 will be managed and controlled by the processor 50 of the main server 12 in the form of a conventional web interface, e.g., web site or web page, accessible by the surrogate shopper's computing device 18 via the public network 14, and the surrogate shopper will execute steps of the process 800 in this embodiment by interacting with the web interface via interactions with the surrogate shopper's computing device 18. For purposes of the following description, however, the process steps of this portion of the process 800 will be described as being executed by the processor 200 of the surrogate shopper's mobile communication device 16.

Another portion of the process 800, i.e., the portion to the right of the central vertical line and centered under the heading "Main Server," illustratively represents one or more software applications executed by the processor 50 of the main server 12. In one embodiment, this portion of the process 800 is or includes the Surrogate Shopping Module 454 stored in the Surrogate Shopping Management Module 450 (see FIG. 4) in the form of instructions executable by the processor 50 of the main server 12. The process steps of this portion of the process 800 will thus be described below for purposes of this disclosure as being executed by the processor 50 of the main server. In some alternate embodiments, e.g., that may or may not include a main server 12, this portion of the process 800 may alternatively be stored in the memory 36 (and/or data storage 38) of one or more of the local servers 22 in the form of instructions executable by the processor 32 of the one or more local servers 22, stored in the memory of one of the point-of-sale systems $24_1$-$24_M$ within one or more of the brick-and-mortar enterprise locations $25_1$-$25_L$ in the form of instructions executable by a processor associated with any such point-of-sale system $24_1$-$24_M$, and/or stored in a memory and executable by a processor of another system external to or supplemental to the system 10 illustrated FIG. 1. It will further be understood that portions of the process 800 executed by any one processor/device or one processor/server or one processor/system may alternatively be executed by a different processor/device or processor/server or processor/system in the system 10, and/or by two or more such processors in any one or combination of such devices, servers and/or systems, some examples of which are described above.

The process 800 begins at step 802 where, in one embodiment of the process 800, the surrogate shopper enters a request for one or more surrogate shopping assignments. Illustratively, the processor 200 is operable at step 802 to control the display 220 to display graphic user interface fields via which the surrogate shopper can enter shopping assignment request information through interaction with the surrogate shopper's mobile communication device 16. The shopping assignment request information entered by the surrogate shopper at step 802 may be or include one or more of a location or locations where the surrogate shopper would like to carry out the surrogate shopping assignment, i.e., the identity or identities of one or more of the brick-and-mortar stores $25_1$-$25_L$ where the surrogate shopper would like to conduct surrogate shopping, the calendar date or dates on which the surrogate shopper is available to shop, the time(s) of day or time window(s) on one or more such dates when the surrogate shopper is available to shop and the quantity or number of separate shopping assignments the surrogate shopper would like to take on during one or more the entered dates and/or at one or more of the entered time(s) of day/time window(s).

The processor 200 of the surrogate shopper's mobile communication device 16 wirelessly transmits the shopping assignment request information entered at step 802 into the shopper's mobile communication device 16, and in one embodiment of step 804 the processor 50 of the main server 12 is operable to compare the shopping assignment request parameters with current remote orders and to generate one or more shopping assignment offers that match the shopping assignment request parameters and/or the surrogate shopper with one or more current remote orders and/or remote shoppers. In some embodiments, the processor 50 is operable to execute step 804 by comparing the location(s), date(s) and time(s) requested by the surrogate shopper with corresponding location(s), date(s) and time(s) of current remote orders and generating the one or more assignment offers based on matching surrogate shopping assignment request parameters and current remote order parameters. In some alternate embodiments, step 802 may be omitted and the processor 50 of the main server 12 may be operable at step 804 to generate assignment offers that match pending remote orders with surrogate shoppers based on location, date, time and/or other criteria established by surrogate shoppers as part of the setup process 700 illustrated in FIG. 7A and described above, examples of which may include, but are not limited to, shopping related information, shopping related preferences, remote shopper connection information and/or reward preferences. In other alternate embodiments, step 802 may be included and the processor 50 of the main server 12 may be operable at step 804 to generate assignment offers that match received shopping assignment request parameters and also that match surrogate shoppers based on location, date, time and/or other criteria established by surrogate shoppers as part of the setup process 700, examples of which may include, but are not limited to, shopping related information, shopping related preferences, remote shopper connection information and/or reward preferences. Alternatively or additionally, the processor 50 of the main server 12 may be operable at step 804 to generate assignment offers for surrogate shoppers previously identified by remote shoppers having current remote orders as preferred surrogate shoppers, e.g., as part of the setup process 750 illustrated in FIG. 7B. Some embodiments of step 804 may include comparing the request parameters with current remote orders and generating assignment offer(s), and other embodiments may include only generating assignment offer(s) as shown parenthetically in FIG. 8. In some embodiments, the processor 50 of the main server 12 is operable at step 804 to transmit the generated assignment offers to mobile communication devices 16 and/or computing devices 18 of one or more surrogate shoppers having surrogate shopping assignment criteria that match with current remote order parameters.

In one or more of the foregoing embodiments of step 804, the processor 50 may be operable to include in the comparison and/or include in the assignment offer generation any information provided by or about the surrogate shopper and/or provided by or about the remote shopper(s) with currently pending order(s). Such information may include, but should not be limited to, profile information, shopping-related information, remote and/or surrogate shopper connection information, customer shopping history (if the remote and/or surrogate shopper is a customer-member of the EMS program), surrogate shopper reward preferences and/or surrogate shopper rating information. As one illustrative example, which should not be considered limiting in any way, the processor 50 may be operable at step 804 to include in the one or more generated assignment offers remote orders which include items that match the shopping expertise of the surrogate shopper and/or remote orders for remote shoppers which have items in their purchase history that match the shopping expertise of the surrogate shopper. As another non-limiting example, the processor 50 may be operable at step 804 to include in the one or more generated assignment offers current remote orders for remote shoppers that have previously indicated a shopper connection with the surrogate shopper and/or with whom the surrogate shopper has previously identified a shopper connection. As still another non-limiting example, the processor 50 may be operable at step 804 to include in the one or more generated assignment offers current remote orders for remote shoppers that live within a predetermined or selected distance from the surrogate shopper. As still another non-limiting example, the processor 50 may be operable at step 804 to include in the one or more generated assignment offers current remote orders for remote shoppers that have previously rated the surrogate shopper above a threshold rating level. As yet another non-limiting example, the processor 50 may be operable at step 804 to exclude from the one or more generated assignment offers all current remote orders for remote shoppers that have previously rated the surrogate shopper below a threshold rating level and/or that have previously excluded the surrogate shopper from being selected for any future remote orders. Other considerations for the comparison and/or assignment offer generation made by the processor 50 at step 804 will occur to those skilled in the art, and it will be understood that any such other considerations are contemplated by this disclosure.

Following step 804, the process 800 advances in some embodiments to step 806 where the processor 200 of the surrogate shopper's mobile communication device 16 is operable to control the display 220 to display the one or more assignment offers generated by the processor 50 of the main server 12 at step 804. Thereafter at step 808, the surrogate shopper accepts or declines one or more of the displayed assignment offer(s) through interaction with the surrogate shopper's mobile communication device 16. If the surrogate shopper declines all assignment offers at step 808, the process 800, in one embodiment, illustratively loops back to step 802 or to step 804 as illustrated in FIG. 8. In alternate embodiments, the process 800 may terminate after step 808 if the surrogate shopper declines all assignment offers, and the process 800 must then be manually restarted to request new assignments.

If the surrogate shopper accepts one or more of the assignment offers at step 808, the processor 200 of the surrogate shopper's mobile communication device 16 is operable to wirelessly transmit the one or more selections to the main server 12, and the processor 50 of the main server 12 is thereafter operable at step 810 to log accepted assignments, e.g., by storing the acceptances in the surrogate shopper's customer account data 404 and associating such acceptances with the surrogate shopper in the customer account data 404. In some embodiments, the process 800 advances to step 812 where the processor 50 of the main server 12 is operable to determine whether a remote shopper has declined to use the surrogate shopper to fulfill a corresponding remote order (e.g., see step 908 of FIG. 9). If so, the process 800 advances to step 822 and otherwise the process 800 advances to step 814 where the processor 50 is operable to generate confirmation(s) of one or more accepted assignments and to wirelessly transmit the same to the surrogate shopper's mobile communication device 16 along with a shopping list for each confirmed surrogate shopping assignment.

Following step 814, the processor 200 of the surrogate shopper's mobile communication device 16 is operable at step 816 to control the display 220 to display the confirmed assignment(s) or, if no accepted assignment offer was confirmed at step 814, to display the corresponding notification. In the latter case, the process 800 illustratively loops from step 816 to step 802 or to step 804, or the process 800 may alternatively terminate. If, at step 816, one or more assignment confirmations are displayed, the process 800 may optionally advance to step 818 as indicated by dashed-line representation in FIG. 8. In such embodiments, the processor 200 of the surrogate shopper's mobile communication device 16 is illustratively operable at step 818 to store the one or more assigned shopping lists in the memory 204 and/or data storage 206. In other embodiments, the main server 12 may instead wirelessly transmit to the surrogate shopper's mobile communication device 16 all assigned shopping lists only upon arrival at the specified brick-and-mortar store 25, and in such embodiments step 818 may be omitted.

Following step 818, or following step 816 in embodiments which do not include step 814, the process 800 advances to step 820 where, during the time period between receipt by the surrogate shopper's mobile communication device 16 of the shopping assignment confirmation(s) at step 814 and execution by the surrogate shopper of the corresponding surrogate shopping assignment(s) (e.g., beginning at step 826), the surrogate shopper may cancel one or more surrogate shopping assignments through interaction with the surrogate shopper's mobile communication device 16, e.g., by entering into a displayed graphic interface one or more cancellation notices. If the surrogate shopper enters one or more such cancellation notices at step 820, the surrogate shopper's mobile communication device 16 wirelessly transmits such one or more cancellation notices to the main server 12, and otherwise the process 800 illustratively advances from step 820 to step 826 as illustrated in FIG. 8.

If, at step 812, one or more remote shoppers has declined to use the surrogate shopper to fulfill one or more corresponding remote orders, and also if, at step 820, the surrogate shopper's mobile communication device 16 wirelessly transmits one or more cancellation notices to the main server 12, the processor 50 of the main server 12 is thereafter operable at step 822 to generate and wirelessly transmit to the surrogate shopper's mobile communication device 16 one or more corresponding assignment decline and/or cancellation acknowledgements, and to update any corresponding remote order assignments accordingly. Thereafter at step 824, the processor 200 of the surrogate shopper's mobile communication device 16 is illustratively operable to control the display 220 to display the one or more generated decline and/or cancellation acknowledgements.

Referring now to FIG. 9, a simplified flow diagram is shown of an embodiment of a generalized process 900 for executing step 606 of the process 600 illustrated in FIG. 6. As indicated by the framework of the process 900 illustrated in FIG. 9, a portion of the process 900, i.e., the portion to the left of the central vertical line and centered under the heading "CD," illustratively represents one or more software applications executed by the processor 300 of a remote shopper's computing device 18, i.e., one of the computing devices $18_1$-$18_K$ owned, controlled or otherwise used by the remote shopper and on which has been previously downloaded and set up the Remote Shopper (RS) application or via which the remote shopper may access a web interface managed and controlled by the processor 50 of the main server 12. In the former case, this portion of the process 900 illustratively is or includes the RS application module 314 stored in the memory 304 (and/or data storage 306) of the remote shopper's computing device 18 in the form of instructions executable by the processor 300 of the remote shopper's computing device 18. Alternatively, this portion of the process 900 may be executed by a mobile communication device 16 associated with the remote shopper in the customer account data 404, in which case the remote shopper application will be installed in whole or in part on the remote shopper's mobile communication device 16. In the latter case, this portion of the process 900 is illustratively provided by the processor 50 of the main server 12 in the form of a graphic user interface (GUI) with GUI elements selectable by the remote shopper and/or with GUI fields in which the remote shopper may enter information, e.g., in each case via remote shopper interaction with the computing device 18, and in any case this portion of the process may thus be executed, at least in part, by the processor 300 of the remote user's computing device 18 and, in part, be or include the Remote Shopping Module 458 stored in the Surrogate shopping Management Module 450 (see FIG. 4) in the form of instructions executable by the processor 50 of the main server 12. For purposes of the following description, however, the process steps of this portion of the process 900 will be described as being executed by the processor 300 of the remote shopper's computing device 18.

Another portion of the process 900, i.e., the portion to the right of the central vertical line and centered under the heading "Main Server," illustratively represents one or more software applications executed by the processor 50 of the main server 12. In one embodiment, this portion of the process 900 is or includes the Remote Shopping Module 458 stored in the Surrogate shopping Management Module 450 (see FIG. 4) in the form of instructions executable by the processor 50 of the main server 12. The process steps of this portion of the process 900 will be described below for purposes of this disclosure as being executed by the processor 50 of the main server. In some alternate embodiments, e.g., that may or may not include a main server 12, this portion of the process 900 may alternatively be stored in the memory 36 (and/or data storage 38) of one or more of the local servers 22 in the form of instructions executable by the processor 32 of the one or more local servers 22, stored in the memory of one of the point-of-sale systems $24_1$-$24_M$ within one or more of the brick-and-mortar enterprise locations $25_1$-$25_L$ in the form of instructions executable by a processor associated with any such point-of-sale system $24_1$-$24_M$, and/or stored in a memory and executable by a processor of another system external to or supplemental to the system 10 illustrated FIG. 1. It will further be understood that portions of the process 900 executed by one processor/device or one processor/server or one processor/system may alternatively be executed by a different processor/device or processor/server or processor/system in the system 10, and/or by two or more such processors in any one or combination of such devices, servers and/or systems, some examples of which are described above.

The process 900 begins at step 902 where the remote shopper enters an order request for one or more items to be purchased from the retail enterprise 11; i.e., a remote order. Illustratively, the processor 200 is operable at step 902 to control the display 220 to display a page of a website controlled by the retail enterprise via which the remote shopper may shop and select for purchase items offered for sale by the retail enterprise 11. Further illustratively, the displayed page, or one or more other pages of the website, includes graphic interface fields via which the remote shopper can enter additional remote order information through interaction with the remote shoppers computing device 18. The additional remote order information entered by the remote shopper at step 902 may be or include one or more of a selection to pick up the order at a specified one of the brick-and-mortar stores, on a specified day or date and/or at a specified time of day or time window on the specified date when the remote shopper would like to pick up the fulfilled remote order. The remote order specified by the remote shopper at step 902 illustratively includes a list of items selected for purchase by the remote shopper as well as any additional remote order information.

The processor 300 of the remote shopper's computing device 18 transmits the remote order information entered at step 902, and in one embodiment the processor 50 of the main server 12 is operable at step 904 to compare the request parameters of the remote order information with available surrogate shoppers, e.g., surrogate shoppers who have requested surrogate shopping assignments in the time frame and location indicated in the remote order information, and to generate one or more recommended surrogate shoppers having corresponding surrogate shopping request parameters that match the remote order request parameters. In some embodiments, the processor 50 is operable to execute step 904 by comparing the location, date and time requested by the remote shopper with corresponding location(s), date(s) and time(s) of current surrogate shopper assignment requests and generating the list recommended surrogate shoppers based on matching remote order parameters and surrogate shopping assignment request parameters. In other embodiments, the processor 50 of the main server 12 may be operable at step 904 to alternatively or additionally include in the list of recommended surrogate shoppers those which specified available location(s), date(s) and/or time(s) as part of the their setup process 700 illustrated in FIG. 7A that match the remote order request parameters. In other embodiments, the processor 50 of the main server 12 may be operable at step 904 to alternatively or additionally include in the list of recommended surrogate shoppers those which specified other criteria as part of the setup process 700 that match one or more of the remote order request parameters and/or that match one or more criteria specified by the remote shopper as part of the setup process 750 illustrated in FIG. 7B. Examples of other criteria specified by surrogate shoppers as part of the setup process 700 may include, but are not limited to, shopping related information such as shopping expertise or store location information, shopping related preferences and/or remote shopper connection information, and examples of criteria specified by the remote shopper as part of the setup process 750 may include, but are not limited to, surrogate shopper connection information and/or surrogate shopper preferences. In still other embodiments, the processor 50 of the main server 12 may be operable at step 904 to alternatively or additionally include in the list of recommended surrogate shoppers one or more surrogate shoppers identified as preferred surrogate shoppers by the remote shopper as part of the setup process 750 illustrated in FIG. 7B. Some embodiments of step 904 may include comparing the request parameters with available and/or preferred surrogate shoppers and generating therefrom a list of recommend surrogate shoppers, and other embodiments may include only generating one or more recommended surrogate shoppers as illustrated parenthetically in FIG. 9.

In one or more of the foregoing embodiments of step 904, the processor 50 may be operable to include in the comparison and/or include in the generation of the list of recommended surrogate shoppers any information provided by or about one or more surrogate shoppers and/or provided by or about the remote shopper. Such information may include, but should not be limited to, profile information, shopping-related information, remote and/or surrogate shopper connection information, customer shopping history (if the remote and/or surrogate shopper is a customer-member of the EMS program), surrogate shopper reward preferences and/or surrogate shopper rating information. Other considerations for the comparison and/or recommended list generation made by the processor 50 at step 904 will occur to those skilled in the art, and it will be understood that any such other considerations are contemplated by this disclosure. In any case, the processor 50 is operable in some embodiments of step 904 to wirelessly transmit the generated list of recommended surrogate shoppers to the remote shopper's computing device 18.

At step 906, the processor 300 of the remote shopper's computing device 18 is illustratively operable to control the display 318 to display the list of recommended surrogate shoppers generated at step 904 by the processor 50 of the main server 12. Thereafter at step 908, the remote shopper selects one of the displayed surrogate shoppers or declines all of the displayed surrogate shoppers through interaction with the remote shopper's computing device 18. If the remote shopper declines all of the displayed surrogate shoppers at step 908, the process 900, in one embodiment, illustratively loops back to step 904 or to step 906 as illustrated in FIG. 9. In some alternate embodiments, the process 900 may terminate after step 908 if the remote shopper declines all of the displayed surrogate shoppers, and the process 900 must then be manually restarted to re-enter a remote order request. In other alternate embodiments, the processor 300 of the remote shopper's computing device 18 may be operable at step 908 to transmit a decline notification to the main server 12 as illustrated by dashed line in FIG. 9, and the processor 50 of the main server 12 may thereafter be operable at step 910 to generate a list of alternative choices and then transmit the same to the remote shopper's computing device 18. Examples of the alternative choices may be or include, but are not limited to, either or both of an option to re-select a surrogate shopper from the list displayed at step 906 and an option to loop back to step 904 to generate another list of surrogate shoppers for consideration by the remote shopper. Those skilled in the art will recognize other alternative choices that may be made available to the remote shopper following rejection at step 908 of all recommended surrogate shoppers, and it will be understood that all such other alternative choices are contemplated by this disclosure.

If, at step 908, the remote shopper selects one of the recommended surrogate shoppers from the displayed list of recommended surrogate shoppers, the processor 300 of the remote shopper's computing device 18 is operable to transmit the selection to the main server 12, and the processor 50 of the main server 12 is thereafter operable at step 910 to log the selected surrogate shopper, e.g., by storing the identity of the selected surrogate shopper in the customer account data 404 and associating the selected surrogate shopper with the remote order in the customer account data 404. Thereafter at step 912, the processor 300 of the remote shopper's computing device 18 is operable to control the display 318 to display the selected surrogate shopper.

In some embodiments, the process 900 advances from step 912, upon receipt and display of the selected surrogate shopper, to step 914 where the remote customer provides payment information, e.g., credit card or other form of electronic payment, and the processor 300 is operable to transmit such payment information to the processor 50 of the main server 12 where, at step 916, the processor 50 is operable to process the payment information in payment for the items specified in the remote order and to transmit to the remote shopper's computing device 18 a payment processing confirmation, e.g., in the form of a virtual sales receipt, which is displayed on the display 318 of the remote shopper's computing device 18 at step 918. In other embodiments of the process 900, the remote shopper may elect or be directed or required by the retail enterprise 11, e.g., via an appropriate display generated by the processor 50 of the main server 12, to tender payment for the remote order at the time of pick up of the fulfilled remote order. In such embodiments, steps 914 and 916 may be omitted or bypassed.

In some embodiments, upon receipt and display of the selected surrogate shopper at step 912, the process 900 also advances to step 918 where the processor 50 of the main server 12 is operable to wirelessly transmit a notice of selection to the mobile communication device 16 of the selected surrogate shopper. Thereafter, and/or following step 916, or following step 910 in embodiments which do not include steps 914 and 916, the processor 50 of the main server 12 is operable at step 920 to determine, in some embodiments, whether acceptance of the surrogate shopping assignment by the selected surrogate shopper has been confirmed or whether the selected surrogate shopper has declined the surrogate shopping assignment and/or whether, during the time period between confirmation of the selected surrogate shopper and execution by the selected surrogate shopper of the surrogate shopping assignment, the selected surrogate shopper has declined or cancelled the surrogate shopping assignment. Illustratively, the processor 50 is operable to execute step 920 by determining whether it has received a confirmation, declined or cancellation notice as described hereinabove with respect to the process 800 illustrated in FIG. 8. If the processor 50 determines at step 920 that acceptance of the surrogate shopping assignment by the selected surrogate shopper has been confirmed, the process 900 advances to step 922 where the processor 300 of the remote shopper's computing device 18 is operable to control the display 318 to display the confirmation. Otherwise, the process 900 advances to step 924 where the processor 50 is operable to generate a notification of the decline or cancellation and to transmit the same to the remote shopper's computing device 18. Thereafter at step 926, the processor 300 of the remote shopper's computing device 18 is operable to control the display 318 to display the notification, and the process 900 illustratively loops from step 926 to step 904 or to step 906.

In one embodiment of steps 604 and 606, as described above, a surrogate shopper desiring a surrogate shopping assignment may select from a list, generated by the processor 50 of the main server 12, of assignments for remote orders that match the surrogate shopper's specified assignment request parameters. In such embodiments, the surrogate shopper is illustratively provided with at least the initial the opportunity to select shopping assignments from assignment request-matching remote orders that are currently pending and unassigned. In the context of the processes illustrated in FIGS. 8 and 9, one example implementation of this embodiment illustratively includes steps 802-810 and 814-824 of the process 800 and steps 902, 910-912 and 920-926 of the process 900. Step 812 in this example is omitted such that step 810 advances directly to step 814, and steps 904-908 and 918 are likewise omitted such that step 902 advances to step 910. Steps 914-916 are optional as described above. In this example, remote orders are requested at step 902 by various remote shoppers executing the process 900 as described above, and the processor 50 of the main server 12 is operable at step 804 to generate for a surrogate shopper executing the process 800 a list of surrogate shopping assignment offers, e.g., in any manner as described above with respect to the process 800 illustrated in FIG. 8. Thereafter at steps 806-810, the surrogate shopper selects one or more of the generated shopping assignment offers to carry out, i.e., to fulfill, and at steps 814-816 the processor 50 confirms the surrogate shopper's assignment selections. In some embodiments of the process 800, step 810 may include the parenthetical portion whereby the processor 50 of the main server 12 is operable to transmit, to the mobile communication device 16 and/or computing device 18 of each remote shopper having placed a remote order corresponding to one of the one or more shopping assignment offers accepted by the surrogate shopper, a notification of confirmation of acceptance by the surrogate shopper of the corresponding shopping assignment, and in such embodiments the process 900 executed by each such remote shopper picks up at step 912 where the mobile communication device 16 and/or computing device 18 of that remote shopper receives and displays the corresponding shopping assignment confirmation. In other embodiments, step 810 may not include the parenthetical portion and the process 900 for each such remote shopper picks up at step 910 where the processor 50 is operable to log the corresponding shopping assignment and transmit a notification thereof to the mobile communication device 16 or computing device 18 of that remote shopper, and thereafter at step 912 the notification is displayed on the display of the remote shopper's mobile communication device 16 or computing device 18. The remainder of the processes 800 and 900 proceed as described above. In this example implementation of steps 604 and 606 of the surrogate shopping process 600 of FIG. 6, surrogate shoppers thus control the selection and confirmation of surrogate shopping assignments, and remote shoppers having remote orders corresponding to such selected surrogate shopping assignments are not given an opportunity to accept or decline them.

Another example implementation of the embodiment of steps 604 and 606 of the process 600 described in the previous paragraph illustratively includes all of the steps 802-824 of the process 800 and steps 902, the non-parenthetical portion of step 904, 906-912 and 920-926 of the process 900. Step 918 is omitted, and steps 914-916 are optional as described above. In this example, remote orders are requested at step 902 by various remote shoppers executing the process 900 as described above, and the processor 50 of the main server 12 is operable at step 804 to generate for a surrogate shopper executing the process 800 a list of surrogate shopping assignment offers, e.g., in any manner as described above with respect to the process 800 illustrated in FIG. 8. Thereafter at steps 806-810, the surrogate shopper selects one or more of the generated shopping assignment offers to carry out, i.e., to fulfill. The process 900 for each remote shopper having placed a remote order corresponding to one of the one or more shopping assignment offers accepted by the surrogate shopper picks up at the non-parenthetical portion of step 904 where the processor 50 is operable to identify the surrogate shopper as the sole recommended surrogate shopper for that remote order, and to then transmit the same to the mobile communication device 16 or computing device 18 for display at step 906 of the corresponding remote shopper that requested that remote order. Thereafter at step 908, the remote shopper may choose to accept or decline the identified surrogate shopper for fulfillment of that remote order. If the remote shopper accepts the surrogate shopper, the process 800 proceeds from the "NO" branch of step 812 through steps 814-824 as described above, and the process 900 proceeds with the accepted surrogate shopper from step 908 through appropriate ones of the remaining steps of the process 900 as described above. If instead the remote shopper chooses to decline the surrogate shopper at step 908, the process 800 proceeds from the "YES" branch of step 812 to step 822 to notify the surrogate shopper that the corresponding shopping assignment selected by the surrogate shopper has been declined, and the process 900 proceeds from step 908 through appropriate ones of the remaining steps of the process 900 as described above. In this example implementation of steps 604 and 606 of the surrogate shopping process 600 of FIG. 6, surrogate shoppers thus control the initial selection of surrogate shopping assignments, and remote shoppers having remote orders corresponding to such selected surrogate shopping assignments are given an opportunity to accept or decline them.

In another embodiment of steps 604 and 606, as described above, a remote shopper placing a remote order may select a surrogate shopper from a list, generated by the processor 50 of the main server 12, of available surrogate shoppers that match the remote shopper's remote order request parameters. In such embodiments, the remote shopper is illustratively provided with at least the initial the opportunity to select a surrogate shopper from possibly multiple remote order request-matching and/or remote shopper-matching surrogate shoppers. In the context of the processes illustrated in FIGS. 8 and 9, one example implementation of this embodiment illustratively includes steps 802 and 814-824 of the process 800 and at least steps 902-912 and 918-926 of the process 900. Steps 804-812 in this example are omitted such that step 802 advances to step 816, and steps 914-916 are optional as described above. In this example, surrogate shopping assignment requests are generated at step 802 by various surrogate shoppers executing the process 800 as described above, and the processor 50 of the main server 12 is operable at step 904 to generate for a remote shopper executing the process 900 a list of recommended surrogate shoppers to fulfill the remote order requested by the remote shopper at step 902, e.g., in any manner as described above with respect to the process 900 illustrated in FIG. 9. Thereafter at steps 906-912, the remote shopper selects one of the surrogate shoppers from the generated list of surrogate shoppers to fulfill the remote order. In embodiments in which the selected surrogate shopper was included in the list of recommended surrogate shoppers generated at step 904 because the selected surrogate shopper requested a surrogate shopping assignment at step 802 that matches the remote order requested by the remote shopper, the process 800 picks up at step 814 where the processor 50 of the main server 12 generates a corresponding shopping assignment confirmation and shopping list, and then transmits the same to the mobile communication device 16 and/or computing device 18 of the selected surrogate shopper for display at step 816. In embodiments in which the selected surrogate shopper was included in the list of recommended surrogate shoppers generated at step 904 because the shopping-related information of the selected surrogate shopper matched the remote order requested by the remote shopper or because the selected surrogate shopper was drawn from the remote shopper's stored surrogate shopper preferences, the processor 50 of the main server 12 is operable, in one embodiment of the process 900, to generate at step 918 a corresponding shopping assignment notification and shopping list and to transmit the same to the mobile communication device 16 and/or computing device 18 of the selected surrogate shopper. In this case, the process 800 illustratively picks up at step 816 where the mobile communication device 16 and/or the computing device 18 of the selected surrogate shopper receives and illustratively displays at least the notification. In other embodiments of the process 900, step 918 may be omitted such that the "S" branch connects to the beginning of step 920, and the process 800 illustratively picks up at step 814 where the processor 50 of the main server 12 generates a corresponding shopping assignment confirmation and shopping list and transmits the same to the mobile communication device 16 and/or computing device 18 of the selected surrogate shopper. In either case, the remainder of the process 800 for the selected surrogate shopper proceeds from step 816 and the remainder of the process 900 for the remote shopper proceeds from step 912 as described above with respect to FIGS. 8 and 9 respectively. In this example implementation of steps 604 and 606 of the surrogate shopping process 600 of FIG. 6, remote shoppers thus control the selection and confirmation of surrogate shoppers to fulfill their remote orders, and surrogate shoppers are not given an opportunity to accept or decline any such assignments (although they may, in some embodiments, cancel one or more assignments as described above with respect to FIG. 8).

Another example implementation of the embodiment of steps 604 and 606 of the process 600 described in the previous paragraph illustratively includes step 802, the non-parenthetical portion of step 804, steps 806-810 and 814-824 of the process 800 and at least steps 902-912 and 920-926 of the process 900. The parenthetical portion of step 804, step 812 and step 918 in this example are omitted, and steps 914-916 are optional as described above. In this example, surrogate shopping assignment requests are generated at step 802 by various surrogate shoppers executing the process 800 as described above, and the processor 50 of the main server 12 is operable at step 904 to generate for a remote shopper executing the process 900 a list of recommended surrogate shoppers to fulfill the remote order requested at step 902, e.g., in any manner as described above with respect to the process 900 illustrated in FIG. 9. Thereafter at steps 906-912, the remote shopper selects one of the surrogate shoppers from the generated list of surrogate shoppers. The process 800 being executed by the surrogate shopper just selected by the remote shopper at steps 906-912 picks up at the non-parenthetical portion of step 804 where the processor 50 is operable to generate a shopping assignment offer for the remote order placed by the remote shopper who selected the surrogate shopper, and to transmit the same to the mobile communication device 16 or computing device 18 of the selected surrogate shopper for display at step 806. Thereafter at step 808, the selected surrogate shopper may choose to accept or decline the shopping assignment offer. If the selected surrogate shopper accepts the shopping assignment offer, the process 800 then proceeds through the remaining steps 810 and 814-824 as described above. At step 920 of the process 900 being executed by the remote shopper who chose the selected surrogate shopper to fulfill the remote shopper's remote order, the processor 50 of the main server 12 transmits a confirmation to the mobile communication device 16 or the computing device 18 of the remote shopper which receives and displays at step 922 the confirmation as a notification to the remote shopper of acceptance by the selected surrogate shopper of the shopping assignment for the remote order requested by the remote shopper. If instead the selected surrogate shopper chooses to decline the shopping assignment offer at step 808, the process 800 loops back to step 802, and at step 924 of the process 900 the processor 50 of the main server 12 generates and transmits a decline notification to the mobile communication device 16 or the computing device 18 of the corresponding remote shopper which receives and displays at step 926 the notification of decline by the selected surrogate shopper of the shopping assignment for the remote offer requested by the remote shopper. The process 900 then loops back to step 904 as described above with respect to FIG. 9. In this example implementation of steps 604 and 606 of the surrogate shopping process 600 of FIG. 6, remote shoppers thus control the initial selection of surrogate shoppers to fulfill their remote orders, and selected surrogate shoppers are then given an opportunity to accept or decline any such shopping assignments.

In yet another embodiment of steps 604 and 606, as described above, surrogate shoppers desiring surrogate shopping assignments may be provided with at least some amount of selectivity among remote orders that match their shopping assignment request parameters, and remote shoppers placing remote orders may likewise be provided with at least some amount of selectivity among surrogate shoppers that match their remote order request parameters. In such embodiments, remote shoppers are illustratively provided with at least an initial opportunity to select surrogate shoppers from possibly multiple remote order request-matching and/or remote shopper-matching surrogate shoppers, and surrogate shoppers are likewise illustratively provided with at least an initial opportunity to select shopping assignments from assignment request-matching remote orders that are currently pending and unassigned. In the context of the processes illustrated in FIGS. 8 and 9, one example implementation of this embodiment illustratively includes steps 802-824 of the process 800 and at least steps 902-912 and 918-926 of the process 900. Steps 914-916 are optional as described above. In this example, surrogate shopping assignment requests are generated at step 802 by various surrogate shoppers executing the process 800 as described above, and remote orders are requested at step 902 by various remote shoppers executing the process 900 as also described above. For any surrogate shopper executing the process 800, the processor 50 of the main server 12 is operable at step 804 to generate for the surrogate shopper a list of surrogate shopping assignment offers, e.g., in any manner as described above with respect to the process 800 illustrated in FIG. 8. Thereafter at steps 806-810, the surrogate shopper selects one or more of the generated shopping assignment offers to carry out. For any remote shopper executing the process 900, the processor 50 of the main server 12 is operable at step 904 to generate for the remote shopper a list of recommended surrogate shoppers to fulfill the remote order requested by the remote shopper at step 902, e.g., in any manner as described above with respect to the process 900 illustrated in FIG. 9. Thereafter at steps 906-912, the remote shopper selects one of the surrogate shoppers from the generated list of surrogate shoppers. In some embodiments of the processes 800 and 900 just described, it is envisioned that such processes may be executed simultaneously or near-simultaneously such that all requested surrogate shopping assignments and/or corresponding surrogate shoppers that match all current remote orders and/or remote shoppers with current remote orders are presented for selection to such remote shoppers with current orders, and that all current remote orders and/or remote shoppers with current remote orders are presented for selection to such surrogate shoppers.

With multiple surrogate shoppers executing the process 800 and multiple remote shoppers executing the process 900, there may be instances where multiple surrogate shoppers have selected the same remote order to fulfill. In some such embodiments, the remote shopper is illustratively presented with such surrogate shoppers at step 906, and at step 908 the remote shopper selects one of the surrogate shoppers to fulfill the remote order. In other embodiments, the processor 50 of the main server 12 may be operable to select a surrogate shopper, among such multiple surrogate shoppers, to fulfill the remote order. In some such embodiments, the processor 50 may do so randomly and in other embodiments the processor 50 may select the surrogate shopper using any information accessible by the processor 50 relating to the remote order request, the remote shopper, one or more of the multiple requested shopping assignments and/or one or more of the multiple surrogate shoppers. Steps 804-810 of the process 800 may be executed prior to step 904 of the process 900 in some such embodiments, and in other embodiments the steps 804 and 904 may occur simultaneously or in any order. In any case, the processes 800 and 900 each illustratively proceed, after such assignments have been confirmed, as described above.

With multiple surrogate shoppers executing the process 800 and multiple remote shoppers executing the process 900, there may alternatively or additionally be instances where multiple remote shoppers have selected the same surrogate shopper to fulfill a remote order at or near the same time frame. In some such embodiments, the surrogate shopper is illustratively presented with such remote orders at step 806, and at step 808 the surrogate shopper may select one or more of the time-conflicting remote orders to fulfill. In other embodiments, the processor 50 of the main server 12 may be operable to select one or more of the time-conflicting orders to assign to the surrogate shopper. In some such embodiments, the processor 50 may do so randomly while in other embodiments the processor 50 may select the one or more time-conflicting orders to assign to the surrogate shopper using any information accessible by the processor 50 relating to the multiple remote order requests, the multiple remote shoppers, the shopping assignment requested by the surrogate shopper and/or the surrogate shopper. Steps 904-910 of the process 900 may be executed prior to step 804 of the process 800 in some such embodiments, and in other embodiments the steps 804 and 904 may occur simultaneously or in any order. In any case, the processes 800 and 900 each illustratively proceed, after such assignments have been confirmed, as described above.

In still another embodiment of steps 604 and 606, as described above, the processor 50 of the main server 12 may process surrogate shopping assignment requests and remote order requests and match surrogate shoppers with remote order requests without providing either of the surrogate and remote shoppers with selectivity of the other. In the context of the processes illustrated in FIGS. 8 and 9, one example implementation of this embodiment illustratively includes steps 802, the parenthetical portion of step 804, 810 and 814-824 of the process 800 and steps 902, the parenthetical portion of step 904, 910, 912 and 920-926. The non-parenthetical portion of step 804 and steps 806, 808 and 812 are omitted in this example such that step 804 advances to step 810 and step 810 advances to step 814. The non-parenthetical portion of step 904 and steps 906, 908 and 918 are also omitted in this example such that step 904 advances to step 910. Steps 914-916 are optional as described above. In this example, surrogate shopping assignment requests are generated at step 802 by various surrogate shoppers executing the process 800 as described above, and remote order requests are generated at step 902 by various remote shoppers executing the process 900 as also described above. In one embodiment, the processor 50 of the main server 12 is operable at steps 804 and 904 to continually compare all pending remote order requests with all pending surrogate shopping assignment requests and automatically pair, log and confirm remote order requests with appropriate surrogate shopping assignment requests. As in any of the embodiments of steps 604 and 606 of the process 600 described herein, the processor 50 may take into account in the comparison and pairing process some or all of the information contained in the remote order requests, e.g., store selection, requested fulfillment date, requested pickup time, etc., and some or all of the information contained in the surrogate shopping assignment requests, e.g., store location(s), available shopping date(s), available shopping time(s), etc. Alternatively or additionally, the processor 50 of the main server 12 may take into account in the comparison and pairing process profile information and surrogate shopper connection information of any number of remote shoppers, and profile information, shopping-related information, remote shopper connection information, reward preferences and rating values of any number of surrogate shoppers, and unilaterally pair pending remote order requests with surrogate shoppers to fulfill them. In any case, the processes 800 and 900 each illustratively proceed, after such assignments have been confirmed, as described above.

Figure 10:
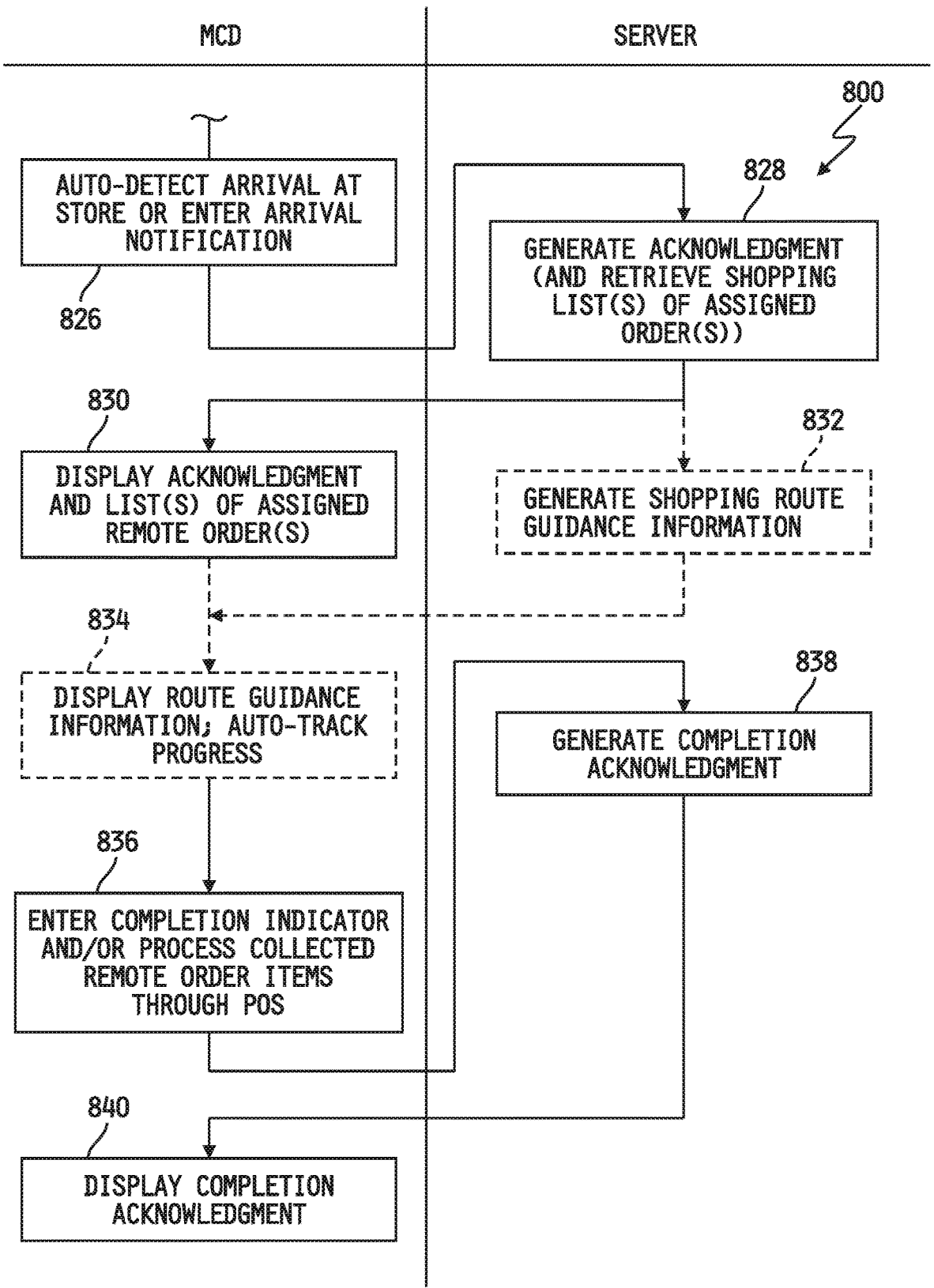
FIG. 10 is a simplified flow diagram of an embodiment of a process for monitoring and/or guiding execution of surrogate shopping assignments in brick-and-mortar stores of the retail enterprise.

Referring again to FIG. 6, the process 600 advances from steps 604 and 606 to step 608 where the processor 50 of the main server 12 and the processor 200 of the surrogate shopper's mobile communication device 16 cooperate to track or monitor execution by the surrogate shopper of the surrogate shopping assignment. Referring now to FIG. 10, a simplified flow diagram is shown of a continuation of the process 800, and the portion of the process 800 illustrated in FIG. 10 illustratively executes step 608 of the process 600 illustrated in FIG. 6. The framework of the portion of the process 800 shown in FIG. 10 is illustratively identical to that of FIG. 8, and the portion of the process 800 illustrated in FIG. 10 picks up at step 826 to which the process 800 advances following execution of step 820 as illustrated in FIG. 8. At step 826, the mobile communication device 16 of the surrogate shopper entering or located within a brick-and-mortar store 25 is identified. In one embodiment, the mobile communication device 16 is automatically detected at step 826, e.g., as described above with respect to FIG. 5, as the surrogate shopper carrying the device 16 enters the brick-and-mortar store 25 and passes within range of one or more position identification devices $26_1$-$26_N$ located at or near an entrance to the store 25 through which the customer has entered. In other embodiments, the mobile communication device 16 may be automatically detected at step 826, e.g., as described above with respect to FIG. 5, as the surrogate shopper passes within range of one or more position identification devices $26_1$-$26_N$ located within the store 25. In either case, the communication process shown in FIG. 5 illustratively occurs via which the mobile communication device 16 automatically detects UID signals broadcast by one or of in-range position identification devices $26_1$-$26_N$, the mobile communication device 16 wirelessly transmits the UID information and the CI information associated with the mobile communication device 16 to the main server 12, and the processor 50 of the main server 12 processes such information to determine the identity of the surrogate shopper and the location thereof, e.g., the location and identity of the one of the brick-and-mortar stores $25_1$-$25_L$ in which the surrogate shopper has entered or is otherwise present and, in some embodiments the location of the surrogate shopper within the identified brick-and-mortar store 25. In some embodiments, the processor 50 is illustratively operable to execute step 826 by comparing the UID to information contained in the PID data 410 and/or store location data 408, and by comparing the CI information to the user account data 402. In other embodiments, the processor 50 of the main server 12 may be configured to automatically identify the surrogate shopper's identity and location using any of the alternative detection structures and techniques described herein.

In other embodiments, the mobile communication device 16 of a surrogate shopper entering or located within a brick-and-mortar store 25 may be identified at step 826 via surrogate shopper interaction with the surrogate shopper's mobile communication device 16 as the surrogate shopper enters the store 25 or while the surrogate shopper is present within the store 25. In such embodiments, for example, the processor 200 may be operable when the SS application is launched by the surrogate shopper to display a selectable graphic element on the display 220, and upon selection by the surrogate shopper of the graphic element the processor 200 may wirelessly transmit the surrogate shopper's identity and location information to the main server 12. The processor 50 of the main server 12 may alternatively determine the location of the surrogate shopper via a location-based service operating on the surrogate shopper's mobile communication device 16, via an identifier of the store WiFi network 28 used to wirelessly transmit the surrogate shopper's identity to the main server 12, via the last-known GPS position of the surrogate shopper's mobile communication device 16 and/or via one or more position identification devices $16_1$-$16_L$.

In any case, the process 800 advances from step 826 to step 828 where the processor 50 of the main server 12 is operable to generate and wirelessly transmit to the surrogate shopper's mobile communication device 16 an acknowledgement of the arrival or presence of the surrogate shopper at the store 25 which the surrogate shopper has been assigned to fulfill the remote order. In some embodiments, the processor 50 may be further operable at step 828 to retrieve from memory and wirelessly transmit to the surrogate shopper's mobile communication device 16 the one or more shopping lists associated with the one or more remote orders assigned to the surrogate shopper and to be fulfilled during the present visit to the brick-and-mortar store 25. Thereafter at step 830, the processor 200 of the surrogate shopper's mobile communication device 16 is operable to control the display 220 to display the acknowledgement and, in some embodiments, the list(s) of assigned remote order(s).

In some embodiments, the process 800 may optionally include a route guidance feature and in such embodiments the process 800 may include steps 832 and 834 as illustrated by dashed-line representation in FIG. 10. In such embodiments, the processor 50 is operable to execute step 832 to generate, based on the items contained in the one or more remote orders assigned to the surrogate shopper and which the surrogate shopper is presently fulfilling at the brick-and-mortar store 25, a suggested route for the surrogate shopper to take through the store 25 during execution of the surrogate shopping assignment(s), and to wirelessly transmit the same to the surrogate shopper's mobile communication device 16 for display thereon under the control of the processor 200 at step 834. In some embodiments, the suggested route may be a most efficient or otherwise highly efficient route in terms of the amount of time expected to retrieve and collect from within the store 25 all of the items specified in the surrogate shopping assignment(s). Alternatively or additionally, the suggested route may be a route designed to avoid or minimize time spent in congested areas of the store 25 and, in this regard the suggested route may depend on the time of day and/or day of the week or month that the surrogate shopper is executing the shopping assignment(s). Alternatively or additionally still, the suggested route may be a route designed to preserve the integrity of the items to be collected, e.g., a route which causes the surrogate shopper to collect heavy and/or non-delicate items first and light and/or delicate items last, and in this regard the suggested route may depend on the composition of the one or more remote orders. Any such suggested route may serve to minimize the amount of time require by the surrogate shopper to execute the one or more remote order assignments and/or preserve the integrity of one or more collected items, and it will be appreciated that the value of any such suggested route may increase as the number of remote orders to be executed by a surrogate shopper during any one shopping expedition also increases.

In any case, in embodiments which include a route guidance feature, the route guidance feature may be implemented in any of various different ways. In one embodiment, for example, the processor 50 may be operable to superimpose a visual path onto a planogram of the layout of the store 25 that is stored in the store location data 408, and the combination of the path and the planogram may be wirelessly transmitted to and displayed on the surrogate shopper's mobile communication device 16. Alternatively or additionally, the surrogate shopper's path and/or the surrogate shopper's progress thereon may be generated and tracked dynamically using any number of the position indication devices $26_1$-$26_N$ located within the store 25. Those skilled in the art will recognize other devices and/or techniques that may be used to implement such a route guidance feature, and it will be understood that any such other devices and/or techniques are contemplated by this disclosure.

Following step 834, or following step 830 in embodiments that do not include step 834, the process 800 advances to step 836 where, after completion by the surrogate shopper of the surrogate shopping assignment within the brick-and-mortar store, the surrogate shopper enters a completion indicator through interaction with the surrogate shopper's mobile communication device 16. Illustratively, completion by the surrogate shopper of the surrogate shopping assignment may be defined as collection by the surrogate shopper from within the store 25 of all items in each remote order being fulfilled by the surrogate shopper during the present visit to the store 25, and in such embodiments the completion indicator may be manually entered by the surrogate shopper into the surrogate shopper's mobile communication device 16, e.g., by selecting a displayed completion GUI element, entering a static or dynamic completion code into a displayed GUI field and/or by pressing a button on the shopper's mobile communication device 16. Alternatively, completion may be defined as successful passage of a quality control step following collection of all such items, e.g., inspection and comparison of the collected items with the one or more assigned shopping lists, and in such embodiments the completion indicator may be manually entered by the surrogate shopper into the surrogate shopper's mobile communication device 16, e.g., in the form of a static code or a unique code associated with the surrogate shopping assignment, or automatically entered into the surrogate shopper's mobile communication device 16, e.g., by scanning or capturing an image of a completion code provided by an employee of the retail enterprise or displayed on a display device or monitor under control of the main server 12, of one of the hub servers 22 and/or of one of the point-of-sale systems $24_1$-$24_M$. Alternatively still, completion may be defined as successful processing of the collected items through one of the point-of-sale systems $24_1$-$24_M$, and in such embodiments the completion indicator may be manually entered by the surrogate shopper into the surrogate shopper's mobile communication device 16, e.g., in the form of a static code or a unique code provided on a point-of-sale receipt or screen, or automatically entered into the surrogate shopper's mobile communication device 16, e.g., by scanning or capturing an image of such a completion code. In any case, the processor 200 of the surrogate shopper's mobile communication device 16 is operable at step 836 to wirelessly transmit the completion indicator to the main server 12, and at step 838 the processor 50 of the main server 12 is operable to generate a completion acknowledgement and wirelessly transmit the same back to the surrogate shopper's mobile communication device 16. In embodiments in which completion may be defined as successful processing of the collected items through one of the point-of-sale systems $24_1$-$24_M$, the completion indicator may be automatically generated at step 838 by the point-of-sale system, by the hub server 22 and/or by the processor 50 of the main server 12, prior to transmission of the completion acknowledgement to the surrogate shopper's mobile communication device 16, and in such embodiments step 836 may be omitted from the process 800. In any case, following step 838, the processor 200 of the surrogate shopper's mobile communication device 16 is operable at step 840 to control the display 220 to display the completion acknowledgement.

Referring again to FIG. 6, the process 600 advances from step 608 to step 610 where the processor 50 is operable to generate or otherwise process the reward or rewards earned by the surrogate shopper for discharging the one or more surrogate shopping assignments. In some embodiments, the surrogate shopper may receive a single reward for each surrogate shopping assignment completed, and in other embodiments the surrogate shopper may receive a single composite reward for completing, simultaneously or otherwise, multiple surrogate shopping assignments. In some embodiments, the reward(s) may take the form of one or more virtual discount coupons (VDC) generated by the processor 50 of the main server 12 or selected by the processor 50, e.g., from the VDC database 406. Any such VDC may be any type of VDC, examples of which may include, but are not limited to, a monetary price reduction, a percentage price reduction, any number of free items for the purchase of some number of the same or other items, some number of reduced-cost items for the purchase of some number of the same or other items, etc. In other embodiments, the reward(s) may take the form of a cash-equivalent voucher that may be spent or redeemed only at and by the retail enterprise 11 against one or more products and/or services offered for sale by the retail enterprise 11. Alternatively or additionally, the reward(s) may take the form of a product or service-specific voucher that may be redeemed only at and by the retail enterprise 11 against the corresponding product or service. In still other embodiments in which the process 700 includes step 710, the reward(s) may take the form of one or more rewards specified by the surrogate shopper in the reward preferences step 710 of the process 700. In any case, examples of such reward(s) may include, but are not limited to, reward(s) generated or selected by the main server 12, reward(s) selectable by the surrogate shopper from a pool of rewards, reward(s) redeemable at and by the retail enterprise 11 only against one or more selected product brands, reward(s) in the form of credit usable against selectable or specified products or services offered for sale by the retail enterprise 11, rewards redeemable only at one or more specific merchandise areas $30_1$-$30_P$ of the retail enterprise 11 (e.g., food, pharmacy, fuel, general merchandise, clothing, seasonal, sporting good, electronics, etc.), reward(s) in the form of accruable or accumulatable credits usable at any time or upon accumulation of a specific dollar amount against selectable products or services offered for sale by the retail enterprise 11, reward(s) in the form of credits giftable to other customer-members of the EMS program, reward(s) in the form of perks redeemable and receivable during surrogate and/or personal shopping expeditions at any of the brick-and-mortar stores, e.g., complementary coffee while shopping, no-waiting checkout, preferential parking, etc., and the like.

In embodiments in which the surrogate shopper is a customer-member of an EMS program controlled and managed by the main server 12 as described above, any such reward(s) may illustratively take the form of one or more VDCs and/or virtual vouchers automatically stored by the processor 50 of the main server 12 in the surrogate shopper's VDC repository 406. Alternatively, and in embodiments in which the surrogate shopper is not a customer of an EMS program controlled and managed by the main server 12, any such reward(s) may illustratively take the form of one or more VDCs and/or virtual vouchers transmitted by the processor 50 of the main server 12 to the surrogate shopper's mobile communication device 16 and/or to the surrogate shopper's computing device. Alternatively still, any such reward(s) may illustratively take the form of one or more physical coupons and/or vouchers provided to the surrogate shopper by an employee of the retail enterprise 11.

Following step 610, the process 600 advances to step 612 where the processor 50 is operable to carry out one or more order completion processes. As one example, the processor 50 may be operable at step 612 to transmit to the remote shopper's computing device 18 a notification of completion of the remote order, i.e., a notification indicating that the remote order has been fulfilled and is ready for pick up as specified at step 902 of the process 900 illustrated in FIG. 9. As another example, the processor 50 may be operable at step 912 to transmit to the remote shopper's computing device 18 a prompt or other message reminding the remote shopper to rate the performance of the selected surrogate shopper. If the remote shopper decides that it is desirable to do so, the remote shopper may, through interaction with the remote shopper's computing device 18 or mobile communication device 16, execute step 758 of the process 750 illustrated in FIG. 7B to enter a rating value that is indicative of the remote shopper's perceived performance of the surrogate shopper in fulfilling the remote order. In any case, following steps 602 and 612, the process 600 illustratively loops back to step 602, 604 and 606 or, alternatively, terminates.

While the disclosure has been illustrated and described in detail in the drawings and foregoing description, such an illustration and description is to be considered as exemplary and not restrictive in character, it being understood that only illustrative embodiments have been shown and described and that all changes and modifications consistent with the disclosure and recited claims are desired to be protected. For example, in some alternative embodiments one or more of the processes 600, 700, 750, 800 and 900 described herein may be implemented in the form of one or more decentralized applications (so-called "Dapps") stored in a so-called "blockchain" database in which one or more cryptographic tokens is/are used to access such applications.

As another example, one or more aspects of one or more of the processes 600, 700, 750, 800 and 900 described herein as being implemented in the form of instructions executed by a processor of a mobile communication device 16 and/or a computing device 18 may, in some alternative implementations, be implemented in the form of a website hosted and maintained on and by the main server 12 and accessed wirelessly by mobile communication devices 16 and/or wirelessly or non-wirelessly by computing devices 18. In such implementations, a user may launch a web browser application program on a mobile communication device 16 or a computing device 18, and may select a bookmark or type in the Universal Resource Locator (URL) for the website. As a result, a request is sent to the main server 12 which provides information (e.g., an HTML file) to the mobile communication device 16 and/or computing device 18 for generating a graphic display of the website. In such implementations, "wirelessly transmitting" information from the main server 12 to a mobile communication device 16 as well as "transmitting" information from the main server 12 to a computing device 18, as described hereinabove, is carried out by the main server 12 sending to the mobile communication device 16 and/or the computing device 18 a predefined webpage, sending a new webpage to replace the display of the previously-displayed webpage, or sending a conventional command for modifying the display of the existing webpage. Wirelessly transmitting information from a mobile communication device 16 to the main server 12 as well as transmitting information from a computing device 18 to the main server 12, as also described hereinabove, refers to user interactions with one or more graphical user interfaces of the website generated by the main server 12 and displayed on a display of the mobile computing device 16 and/or computing device 18, and/or other interactions involving the user's mobile communication device 16 and/or computing device 18 identifying the user input, and wirelessly (or non-wirelessly) sending to the main server 12 information that indicates the type of user input that was provided.

As yet another example, it will be understood that while several process steps in various sequences have been illustrated and described herein with respect to the processes 600, 700, 750, 800 and 900 any or all of the processes 600, 700, 750, 800 and 900 may alternatively include more, fewer and/or different steps, and that any such steps may be executed in different sequences from those illustrated and described, without departing from the scope of the concepts and techniques described herein.

In the embodiments described herein, the position identification devices $26_1$-$26_N$ have been described as being implemented as wireless signal broadcasting devices, e.g., conventional radio frequency broadcasting beacons, configured to broadcast wireless signals each containing UID. In some alternate embodiments, one or more of the PIDs may be implemented as wireless signal transceivers configured to can broadcast and receive wireless signals and/or as wireless signal receivers configured to receive broadcast wireless signals, e.g., broadcast by a mobile communication device or other device and, in some cases, to communicate directly (wired and/or wirelessly) with the main server 12, one or more of the local hub servers 22 and/or one or more of the POS systems 24. In some such embodiments, one or more of the wireless signal transceivers and/or receivers may include one or more conventional processors and one or more memory devices having instructions stored therein executable by the one or more processors to execute one or more of steps for determining an identity of an individual carrying a mobile communication device within and/or near a store 25.

In other alternate embodiments, one or more PIDs 26 may be implemented in the form of a combination of conventional Global Positioning System (GPS) satellites and a GPS receiver on-board a mobile communication device.

In other alternate embodiments, one or more PIDs 26 may be implemented in the form of one or more in-store WiFi Access Points which establish one or more in-store or store-wide hotspot having a unique internet access ID (HotSpotID) accessible by a mobile communication device. In such embodiments, the server 12 may determine a location of a mobile communication device in accordance with the unique internet access ID used by the mobile communication device to communicate with the mobile communication device.

In other alternate embodiments, one or more PIDs 26 may be implemented in the form of a combination of the earth's Geomagnetic Field and a magnetometer on-board a mobile communication device. In such embodiments, the server 12 may determine the location of a mobile communication device in accordance with the unique magnetic field signature captured by the magnetometer and wirelessly transmitted to the server 12 by the mobile communication device. In such embodiments, the server database may have one or more maps, tables, lists or the like mapping magnetic signature profiles within one or more of the stores to locations or positions within one or more of the stores, and the server 12 may be operable in such embodiments to determine the in-store location or position of a mobile communication device by comparing the unique magnetic field signature wirelessly transmitted by the mobile communication device to the stored magnetic signature profiles.

In other alternate embodiments, one or more of the PIDs may be implemented in the form of a combination of a camera on-board a mobile communication device and a product label affixed to product or product location within a store. In such embodiments, the camera may be operated to capture an image of the product label and wirelessly transmit the image to the server. The server may then compare the image to stored product data to determine the in-store location thereof.

In other alternate embodiments, one or more of the PIDs may be implemented in the form of a combination of a mobile communication device with a keypad and a customer/employee application operating on the mobile communication device. In such embodiments, the customer/employee application may display one or more manually selectable GUI elements for manually entering the location of the mobile communication device, and the mobile communication device may then wirelessly transmit the location information to the server.

In other alternate embodiments, one or more of the PIDs may be implemented in the form of a wireless signal transmission device, e.g., RFID Tag, NFC device, etc., attached to customer-selected product. In such embodiments, the wireless signal transmission device may be configured to wirelessly transmit product information (e.g., brand, size, etc.) and/or location (e.g., department, aisle, shelf position, etc.) to a mobile communication device which then wirelessly transmits the information to the server.

In other alternate embodiments, one or more of the PIDs may be implemented in the form of a combination of one or more in-store Cameras and a server-based facial and/or product recognition application. In some such embodiments, the server may process camera images and/or video and compare facial images with stored customer images to identify customers. In other embodiments, the server may process the camera images and/or video and compare product images, e.g., in customer's possession (basket, handcarried, etc.) with stored product images, and then predict the customer's identity based on information contained in customer shopping histories.

In other alternate embodiments, one or more PIDs may be implemented in the form of a combination of one or more electromagnetic radiation (EMR) generators positioned within a store 25 and a mobile communication device with a camera and/or microphone. In such embodiments, the EMR may be generated in one or more spectral ranges, and be made to vary locally from store-to-store and throughout each store in one or more detectable EMR properties or characteristics, and/or EMR having different properties or characteristics may be generated in each store and in different areas of each store, such that in any case different stores, and different areas within each store, will be subject to different generated EMR properties or characteristics. The different EMR properties and/or characteristics generated in each store and in each area of each store may be stored in an EMR database, and local EMR properties/characteristics may be detected by a mobile communication device and wirelessly transmitted to the server which may then compare such received information to the EMR database to determine the location of the mobile communication device. Examples of such EMR generators and corresponding EMR detectors include, but are not limited to, one or more visible Light Generators and a camera on-board a mobile communication device, one or more audible frequency Generators and a microphone on-board a mobile communication device, one or more radio frequency generators and a radio frequency generator on board a mobile communication device, and the like.

In other alternate embodiments, one or more PIDs may be implemented in the form of one or more mobile communication devices of one or more in-store customers or in-store Employees. In such embodiments, in-store mobile communication devices may be configured to periodically broadcast signals detected by a customer's mobile communication device and/or transmitted directly to the server. Such broadcast signals be or include "location information" signals based on one or more "hard events" such as a recently received unique identification signal transmitted by an in-store wireless signal broadcasting device, a recently scanned or imaged product code, detected product device data, recently received GPS data, recently used HotSpotID data, recently detected EMR data, and/or the like. Alternatively or additionally, the one or more broadcast signals may be or include location information signals based on one or more "soft events" such as locally detected sounds (generated or not), locally detected light (generated or not), locally detected RF signals, and/or the like.

What is claimed is:

1. A method for reward-based surrogate shopping at a retail enterprise, the method comprising:
    receiving, by a server of the retail enterprise, a plurality of remote orders each specified through interaction by a different one of a corresponding plurality of remote shoppers with an associated remote shopper mobile communication device or computing device, each of the plurality of remote orders including order parameters defining for purchase by a corresponding one of the plurality of remote shoppers one or more items offered for sale by the retail enterprise and at least one of a desired date and a desired time of day of fulfillment of the remote order,
    receiving, by the server, a plurality of assignment requests each specified through interaction by a different one of a plurality of surrogate shoppers with an associated surrogate shopper mobile communication device or computing device, each of the plurality of assignment requests including request parameters identifying one of a plurality of brick-and-mortar stores of the retail enterprise and at least one of a desired date and a desired time of day for fulfilling by the corresponding surrogate shopper of one or more remote orders at the identified brick-and-mortar store, comparing, by the server, the plurality of received remote orders with the plurality of received assignment requests and pairing ones of the remote orders with ones of the assignment requests in which at least one of the order parameters matches at least one of the request parameters, and for each of the matched pairs, (i) causing, by the server, at least one of the corresponding surrogate shopper mobile communication device or computing device and the corresponding remote shopper mobile communication device or computing device to display a notification of the matched pair, (ii) receiving, by the server, from an electronic system in the identified brick-and-mortar store or specified through surrogate shopper interaction with the corresponding surrogate shopper mobile communication device or computing device, a completion indicator identifying fulfillment by the corresponding surrogate shopper of the remote order paired therewith, and (iii) providing a reward to the corresponding surrogate shopper following receipt by the server of the completion indicator, the reward redeemable only against products or services offered for sale by the retail enterprise.

2. The method of claim 1, wherein, for each of the plurality of surrogate shoppers, the causing step comprises causing, by the server, the corresponding surrogate shopper mobile communication device or computing device to display each of the plurality of remote orders paired with one of the plurality of assignment requests specified by the surrogate shopper, and wherein the method further includes receiving, by the server and specified through interaction by the surrogate shopper with the corresponding surrogate shopper mobile communication device or computing device, a selected one of the displayed remote orders, and wherein the completion indicator identifies fulfillment by the surrogate shopper of the selected remote order.

3. The method of claim 2, further comprising:

wirelessly transmitting, by the server, the one or more items included in the selected remote order to the corresponding surrogate shopper mobile communication device, and storing, by a processor of the corresponding surrogate shopper mobile communication device, the one or more items included in the selected remote order in a memory of the corresponding surrogate shopper mobile communication device.

4. The method of claim 1, wherein, for each of the plurality of remote shoppers, the causing step comprises causing, by the server, the corresponding remote shopper mobile communication device or computing device to display each of the plurality of surrogate shoppers having assignment requests paired with the one of the plurality of remote orders specified by the remote shopper, and wherein the method further includes receiving, by the server and specified through interaction by the remote shopper with the corresponding remote shopper mobile communication device or computing device, a selected one of the displayed surrogate shoppers, and wherein the completion indicator identifies fulfillment by the selected surrogate shopper of the one of the plurality of remote orders.

5. The method of claim 4, further comprising:

wirelessly transmitting, by the server, the one or more items included in the one of the plurality of remote orders specified by the remote shopper to the surrogate shopper mobile communication device associated with the selected surrogate shopper, and storing, by a processor of the surrogate shopper mobile communication device associated with the selected surrogate shopper, the one or more items included in the one of the plurality of remote orders specified by the remote shopper in a memory of the surrogate shopper mobile communication device associated with the selected surrogate shopper.

6. The method of claim 1, further comprising, for each of the matched pairs:

receiving, by the server, a communication signal wirelessly transmitted by the corresponding surrogate shopper mobile communication device, processing, by the server, the received communication signal to determine whether the corresponding surrogate shopper mobile communication device is located at or within the identified one of the plurality of brick-and-mortar stores of the retail enterprise, and if the server determines that the corresponding surrogate shopper mobile communication device is at or within the identified one of the plurality of brick-and-mortar stores causing, by the server, the corresponding surrogate shopper mobile communication device to display an acknowledgement signal acknowledging that the surrogate shopper associated with the corresponding surrogate shopper mobile communication device is commencing with fulfillment of the paired remote order.

7. The method of claim 6, further comprising causing, by the server, the corresponding surrogate shopper mobile communication device to display the one or more items included in the paired remote order.

8. The method of claim 6, further comprising causing, by the server, the corresponding surrogate shopper mobile communication device to display a suggested route through the identified one of the plurality of brick-and-mortar stores for collecting the one or more items included in the paired remote order.

9. The method of claim 1, wherein the reward comprises one of a virtual discount coupon and a virtual voucher, and wherein providing the reward to the corresponding surrogate shopper following receipt by the server of the completion indicator comprises storing, by the server, the reward in a database accessible by the server and by the corresponding surrogate shopper.

10. The method of claim 9, wherein the database includes a plurality of virtual repositories each associated exclusively with, and accessible exclusively by, a different one of the plurality of surrogate shoppers, and wherein storing, by the server, the reward in the database comprises storing, by the server, the reward in the one of the plurality of virtual repositories associated with the corresponding surrogate shoppers.

11. The method of claim 1, wherein the identified one of the plurality of brick-and-mortar stores includes a peripheral device in the form of a printer coupled to the server, and wherein providing the reward to the corresponding surrogate shopper following receipt by the server of the completion indicator comprises printing, by the server, the reward using the printer.

12. A method for reward-based surrogate shopping at a retail enterprise, the method comprising:

receiving, by a server of the retail enterprise, a plurality of remote orders each specified through interaction by a different one of a corresponding plurality of remote shoppers with an associated remote shopper mobile communication device or computing device, each of the plurality of remote orders including order parameters defining for purchase by a corresponding one of the plurality of remote shoppers one or more items offered for sale by the retail enterprise and at least one of a desired date and a desired time of day of fulfillment of the remote order, receiving, by the server, an assignment request specified through interaction by a surrogate shopper with a surrogate shopper mobile communication device or computing device, the assignment request including request parameters identifying one of a plurality of brick-and-mortar stores of the retail enterprise and at least one of a desired date and a desired time of day for fulfilling by the corresponding surrogate shopper of a remote order at the identified brick-and-mortar store, comparing, by the server, the plurality of received remote orders with the received assignment request and causing, by the server, the surrogate shopper mobile communication device or computing device to display each of the plurality of remote orders in which at least one of the order parameters matches at least one of the request parameters, receiving, by the server, a selected one of the displayed remote orders specified through interaction by the surrogate shopper with the surrogate shopper mobile communication device or computing device, receiving, by the server, from an electronic system in the identified brick-and-mortar store or specified through surrogate shopper interaction with the surrogate shopper mobile communication device or computing device, a completion indicator identifying fulfillment by the surrogate shopper of the selected remote order, and providing a reward to the surrogate shopper following receipt by the server of the completion indicator, the reward redeemable only against products or services offered for sale by the retail enterprise.

13. The method of claim 12, further comprising:

wirelessly transmitting, by the server, the one or more items included in the selected remote order to the surrogate shopper mobile communication device, and storing, by a processor of the surrogate shopper mobile communication device, the one or more items included in the selected remote order in a memory of the surrogate shopper mobile communication device.

14. The method of claim 12, further comprising:

receiving, by the server, a communication signal wirelessly transmitted by the surrogate shopper mobile communication device, processing, by the server, the received communication signal to determine whether the surrogate shopper mobile communication device is located at or within the identified one of the plurality of brick-and-mortar stores of the retail enterprise, and if the server determines that the surrogate shopper mobile communication device is at or within the identified one of the plurality of brick-and-mortar stores, causing, by the server, the surrogate shopper mobile communication device to display an acknowledgement signal acknowledging that the surrogate shopper associated with the surrogate shopper mobile communication device is commencing with fulfillment of the selected remote order.

15. The method of claim 14, further comprising causing, by the server, the surrogate shopper mobile communication device to display the one or more items included in the selected remote order.

16. The method of claim 14, further comprising causing, by the server, the corresponding surrogate shopper mobile communication device to display a suggested route through the identified one of the plurality of brick-and-mortar stores for collecting the one or more items included in the selected remote order.

17. The method of claim 12, wherein the reward comprises one of a virtual discount coupon and a virtual voucher, and wherein providing the reward to the corresponding surrogate shopper comprises storing, by the server, the reward in a database accessible by the corresponding surrogate shopper.

18. A method for reward-based surrogate shopping at a retail enterprise, the method comprising:

receiving, by a server of the retail enterprise, a remote order specified through interaction by a remote shopper with a remote shopper mobile communication device or computing device, the remote order including order parameters defining for purchase by the remote shopper one or more items offered for sale by the retail enterprise and at least one of a desired date and a desired time of day of fulfillment of the remote order, receiving, by the server, a plurality of assignment requests each specified through interaction by a different one of a plurality of surrogate shoppers with an associated surrogate shopper mobile communication device or computing device, each of the plurality of assignment requests including request parameters identifying one of a plurality of brick-and-mortar stores of the retail enterprise and at least one of a desired date and a desired time of day for fulfilling by the corresponding surrogate shopper of one or more remote orders at the identified brick-and-mortar store, comparing, by the server, the received remote order with the plurality of received assignment request and causing, by the server, the remote shopper mobile communication device or computing device to display each of the plurality of surrogate shoppers for which at least one of the assignment request parameters matches at least one of the order parameters, receiving, by the server, a selected one of the displayed surrogate shoppers specified through interaction by the remote shopper with the remote shopper mobile communication device or computing device, receiving, by the server, from an electronic system in the identified brick-and-mortar store or specified through interaction by the selected surrogate shopper with the selected surrogate shopper's mobile communication device or computing device, a completion indicator identifying fulfillment by the selected surrogate shopper of the remote order, and providing a reward to the selected surrogate shopper following receipt by the server of the completion indicator, the reward redeemable only against products or services offered for sale by the retail enterprise.

19. The method of claim 12, further comprising:
receiving, by the server, a communication signal wirelessly transmitted by the selected surrogate shopper's mobile communication device,
processing, by the server, the received communication signal to determine whether the selected surrogate shopper's mobile communication device is located at or within the identified one of the plurality of brick-and-mortar stores of the retail enterprise, and
if the server determines that the selected surrogate shopper's mobile communication device is at or within the identified one of the plurality of brick-and-mortar stores, causing, by the server, the selected surrogate shopper's mobile communication device to display an acknowledgement signal acknowledging that the selected surrogate shopper associated with the selected surrogate shopper's mobile communication device is commencing with fulfillment of the remote order.

20. The method of claim 19, further comprising causing, by the server, the selected surrogate shopper's mobile communication device to display the one or more items included in the remote order.

\* \* \* \* \*